United States Patent
Balakrishnan et al.

(10) Patent No.: US 8,397,285 B2
(45) Date of Patent: *Mar. 12, 2013

(54) MULTI-PATTERN PACKET CONTENT INSPECTION MECHANISMS EMPLOYING TAGGED VALUES

(75) Inventors: Santosh Balakrishnan, Gilbert, AZ (US); Venkatraman Ramakrishna, Los Angeles, CA (US)

(73) Assignee: Intel Corporation, Santa Clara, CA (US)

(*) Notice: Subject to any disclaimer, the term of this patent is extended or adjusted under 35 U.S.C. 154(b) by 487 days.

This patent is subject to a terminal disclaimer.

(21) Appl. No.: 12/575,306

(22) Filed: Oct. 7, 2009

(65) Prior Publication Data

US 2010/0088756 A1    Apr. 8, 2010

Related U.S. Application Data

(63) Continuation of application No. 11/173,036, filed on Jun. 30, 2005, now Pat. No. 7,624,436.

(51) Int. Cl.
*G06F 17/00* (2006.01)
*G06F 17/30* (2006.01)
(52) U.S. Cl. ................... 726/13; 726/11; 726/3
(58) Field of Classification Search .......... None
See application file for complete search history.

(56) References Cited

U.S. PATENT DOCUMENTS

| | | | |
|---|---|---|---|
| 6,144,934 A | 11/2000 | Stockwell et al. | |
| 6,182,228 B1 | 1/2001 | Boden et al. | |
| 6,275,861 B1* | 8/2001 | Chaudri et al. | 709/238 |
| 6,631,466 B1 | 10/2003 | Chopra et al. | |
| 7,305,708 B2* | 12/2007 | Norton et al. | 726/23 |
| 7,624,436 B2 | 11/2009 | Balakrishnan et al. | |
| 8,259,722 B1* | 9/2012 | Kharitonov | 370/392 |
| 2004/0039940 A1 | 2/2004 | Cox et al. | |
| 2004/0095936 A1* | 5/2004 | O'Neill et al. | 370/392 |
| 2004/0199630 A1* | 10/2004 | Sarkissian et al. | 709/224 |

FOREIGN PATENT DOCUMENTS

| WO | WO 03/094418 A1 | 11/2003 |
|---|---|---|
| WO | 2007/005704 A1 | 1/2007 |

OTHER PUBLICATIONS

Fast Regular Expression Search, year 1999, by Gonzalo Navarro, Mathieu Raffinot.*
International Preliminary Report on Patentability for Patent Application No. PCT/US2006/025758, mailed Jan. 17, 2008, 7 pages.
European Office Action for Patent Application No. 06774397.1, mailed Jun. 5, 2008, 6 pages.
European Office Action for Patent Application No. 06774397.1, mailed Aug. 12, 2009, 4 pages.
Office Action Received for Chinese Patent Application No. 200680023561.7, mailed on Jun. 10, 2010, 6 Pages of English Translation.

(Continued)

*Primary Examiner* — David Y Jung
(74) *Attorney, Agent, or Firm* — Grossman, Tucker, Perreault & Pfleger, PLLC

(57) ABSTRACT

Methods and apparatus for performing content inspection using multi-pattern packet content inspection mechanisms employing tagged values. Pattern data structures are employed to facilitate multi-pattern searches via corresponding string-search algorithm machines. The pattern data structures include tagged values defining search offsets and depths for corresponding search patterns. Incoming packets are classified to flows, and stored in corresponding flow queues. Flow table entries are used to identify the pattern data structure for a given flow. During content inspection, the algorithm machine employs the tagged values to effectively skip portions of a data stream up to the offset for each search pattern and to cease searching for a pattern upon reaching the depth for the pattern.

18 Claims, 14 Drawing Sheets

OTHER PUBLICATIONS

Doring, Andreas et al., "On Networking Multithreaded Processor Design: Hardware Thread Polarization", IEEE International Symposium on Micro-NanoMechatronics and Human Science, 2005, vol. 1, No. 30, Dec. 30, 2003, pp. 520-523.

Govindarajan, R. et al., "Timed Petri Net Models of Multithreaded Multiprocessor Architectures", Proceedings of the Seventh International Workshop on Petri Nets and Performance Models, Jun. 3-6, 1997, pp. 153-162.

Yi, Kyueun, et al., "Architectural Support for Network Applications on Simultaneous MultiThreading Processors", IEEE International Symposium on Parallel and Distributed Processing, 2007, Mar. 26-30, 2007, pp. 1-10.

PCT/US2006/025758, PCT International Search Report and Written Opinion of the International Searching Authority, mailed Nov. 20, 2006, 10 pages.

Tuck, Nathan et al., "Deterministic Memory-Efficient String Matching Algorithms for Intrusion Detection," IEEE INFOCOM 2004, 36 pages.

Crochemore, Maxime et al., "Pattern Matching and Text Compression Algorithms," pp. 1-44, 1996.

Crochemore, Maxime et al., "Fast Practical Multi-Pattern Matching," pp. 1-13, 1993.

Wu, Sun et al., "A Fast Algorithm for Multi-Pattern Searching," pp. 1-11, May 1994.

Boyer, Robert S. et al., "A Fast String Searching Algorithm," Communication of the ACM, vol. 20, No. 10, pp. 762-772, Oct. 1977.

Prof. Dr. Reinert, Knut, "Advanced Aspects in Sequence Analysis," Sommersemester 2004, FU-Berlin.

Aho, Alfred V. et al., "Efficient String Matching: An Aid to Bibliographic Search," Communication of the ACM, vol. 18, No. 6, pp. 333-340, Jun. 1975.

Ho, JC, "Intrusion Detection Processor with Packet Content Matching," pp. 1-29, Jun. 2, 2005.

Office Action Received for Chinese Patent Application No. 200680023561.7, mailed on Nov. 12, 2010, 2 pages of English Translation.

Gupta et al., "Packet Classification on Multiple Fields", Computer Systems Laboratory, Stamford University (14 pages).

Notice of Granting Patent Right for Invention from related China Application 200680023461.7, Mar. 24, 2011 (3 pages).

Decision to Grant from related European Application 06774397.1, Nov. 17, 2011 (1 page).

* cited by examiner

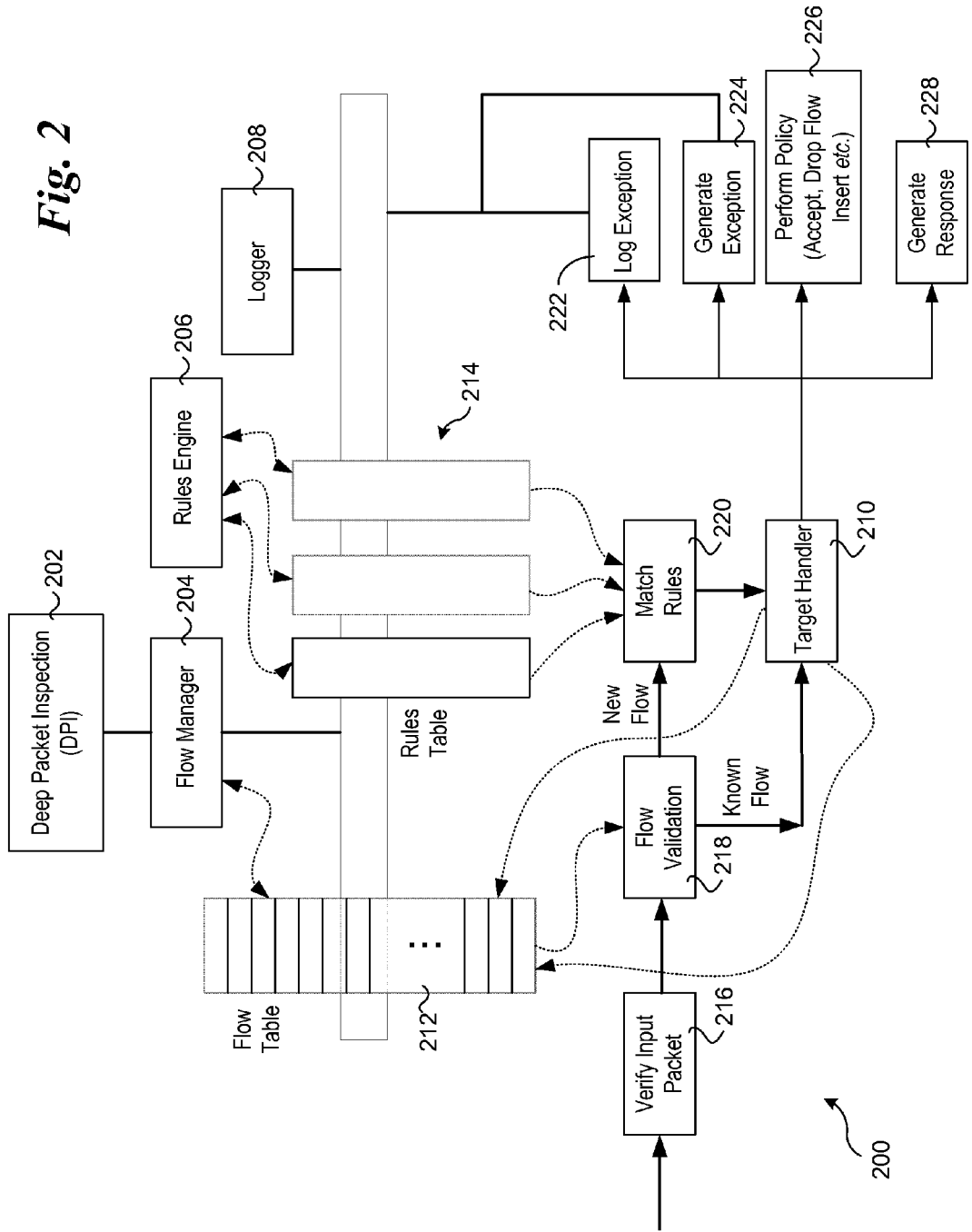

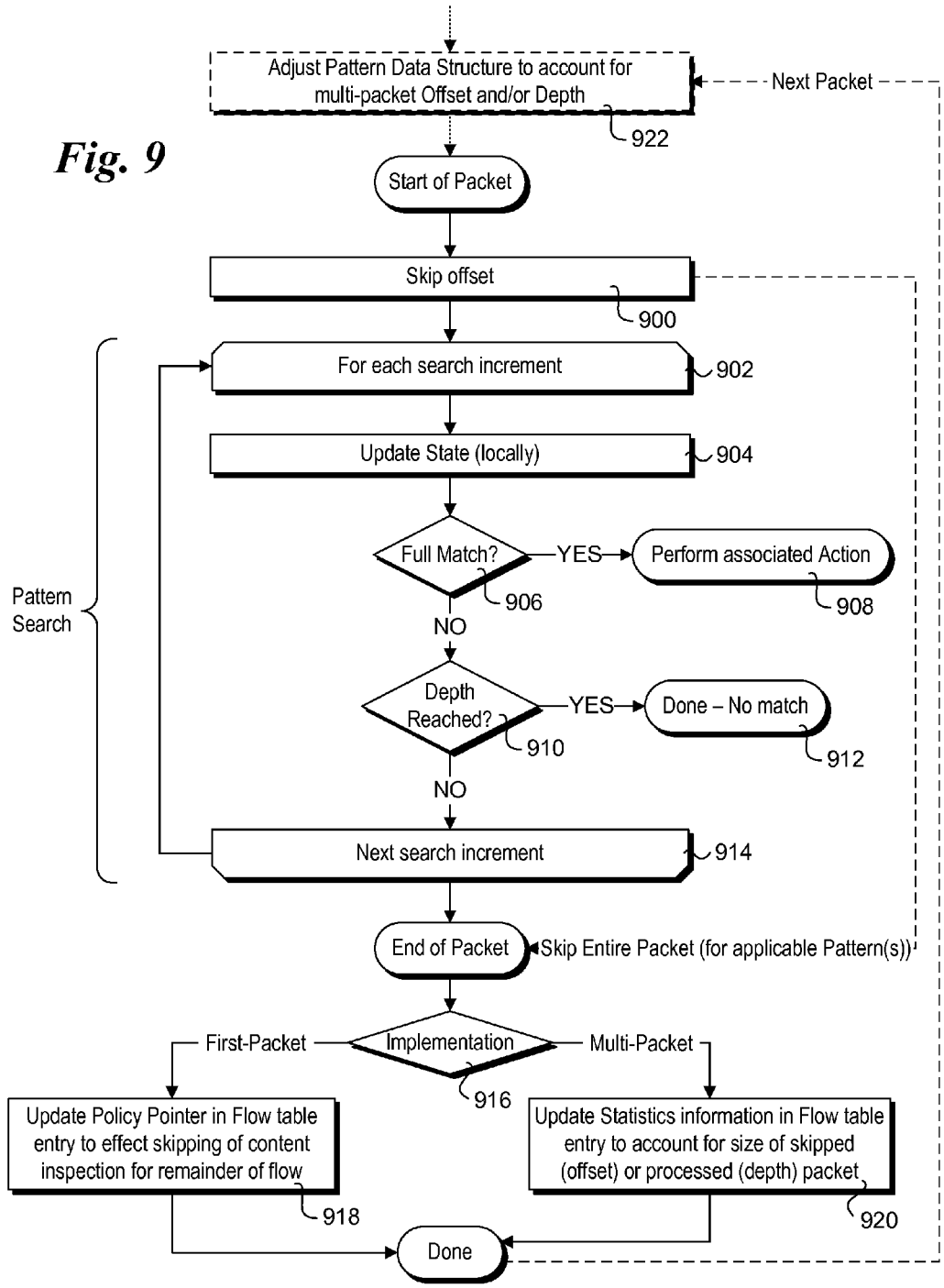

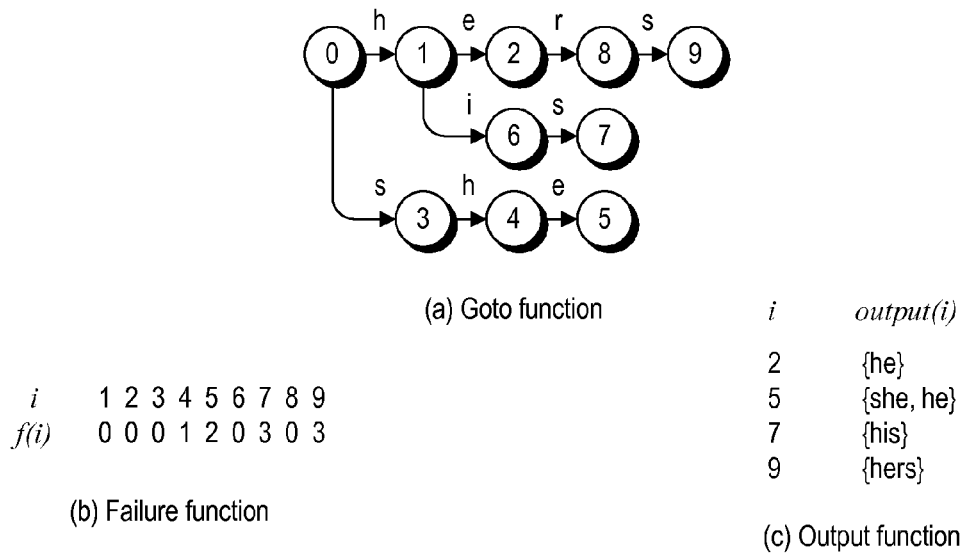
(a) Goto function
*i* 1 2 3 4 5 6 7 8 9
*f(i)* 0 0 0 1 2 0 3 0 3
(b) Failure function
| *i* | *output(i)* |
|---|---|
| 2 | {he} |
| 5 | {she, he} |
| 7 | {his} |
| 9 | {hers} |
(c) Output function
*Fig. 10*
*Fig. 11*
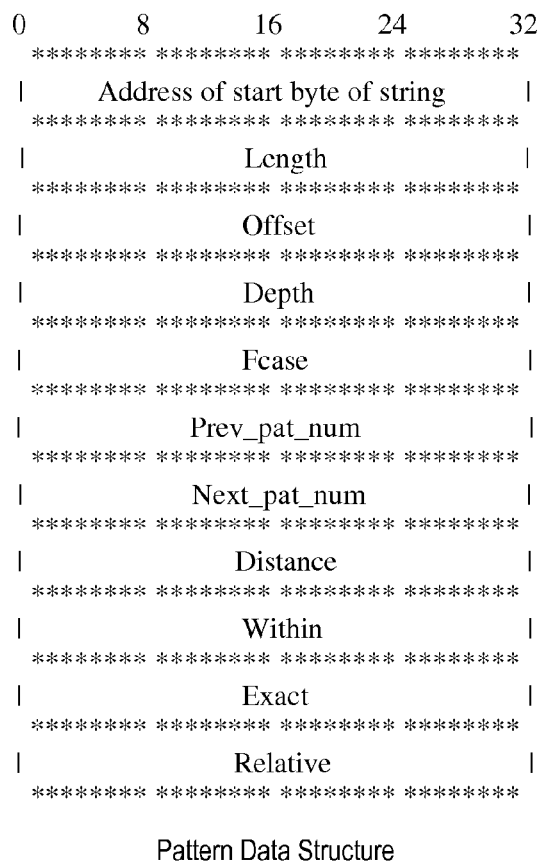
Pattern Data Structure

```
0        8        16       24       32
******** ******** ******** ********
|     Shift      |      Offset      |
******** ******** ******** ********
|     Depth      |     # Outputs    |
******** ******** ******** ********
| # Trans. |   Fail state number (23 bits)   |
******** ******** ******** ********
| Input 1 |      Next state number  1       |
******** ******** ******** ********
|                ........                   |
******** ******** ******** ********
| Input n |      Next state number  n       |
******** ******** ******** ********
| Pattern number 1 |  Pattern number 2      |
******** ******** ******** ********
|                ........                   |
******** ******** ******** ********
|        ........   | Pattern number n      |
******** ******** ******** ********
```

AC Machine Node

```
******** ******** ******** ********
|        Address of machine state 0         |
******** ******** ******** ********
|                ........                   |
******** ******** ******** ********
|       Address of machine state n-1        |
******** ******** ******** ********
```

AC Machine Index Structure

*Fig. 14*

```
0        8        16       24       32
******** ******** ******** ********
|                # Trans.                   |
******** ******** ******** ********
| Input 1 |      Next state number  1      |
******** ******** ******** ********
|                ........                   |
******** ******** ******** ********
| Input n |      Next state number  n      |
******** ******** ******** ********
```

DAWG Data Structure

```
0        8       16       24       32
******** ******** ******** ********
| # Trans. |   AC state number (23 bits)   |
******** ******** ******** ********
| Input 1 |      Next state number  1     |
******** ******** ******** ********
|                ........                  |
******** ******** ******** ********
| Input n |      Next state number  n     |
******** ******** ******** ********
```

Suffix Tree Data Structure

Fig. 15

```
0        8       16       24       32
******** ******** ******** ********
|          Primary Shift ( S[0][0] )       |
******** ******** ******** ********
|         Secondary Shift ( S[0][1] )      |
******** ******** ******** ********
|              Offset ( S[0][2] )          |
******** ******** ******** ********
|              Depth ( S[0][3] )           |
******** ******** ******** ********
|                ..........                |
******** ******** ******** ********
|                ..........                |
******** ******** ******** ********
|                ..........                |
******** ******** ******** ********
|                ..........                |
******** ******** ******** ********
|         Primary Shift ( S[N-1][0] )      |
******** ******** ******** ********
|        Secondary Shift ( S[N-1][1] )     |
******** ******** ******** ********
|             Offset ( S[N-1][2] )         |
******** ******** ******** ********
|              Depth ( S[N-1][3] )         |
******** ******** ******** ********
```

SHIFT Table

Fig. 16

```
0        8        16        24        32
*********************************************
|   # of first pattern in list with hash = 0   |
*********************************************
|                   ..........                 |
*********************************************
|   # of first pattern in list with hash = N-1 |
*********************************************
```

HASH Table

*Fig. 17*

```
0        8        16        24        32
*********************************************
|      Prefix of size B' of pattern # 0        |
*********************************************
|                   ..........                 |
*********************************************
|      Prefix of size B' of pattern # N-1      |
*********************************************
```

PREFIX Table

*Fig. 18*

```
0        8        16        24        32
*********************************************
|      Number of records in child node #1      |
*********************************************
|         SRAM address of child node #1        |
*********************************************
|                   ..........                 |
*********************************************
|     Number of records in child node #A-1     |
*********************************************
|        SRAM address of child node #A-1       |
*********************************************
```

Root Node

*Fig. 19*

```
   0        8       16       24       32
******** ******** ******** ********
|          Record #1: primary shift         |
******** ******** ******** ********
|         Record #1: secondary shift        |
******** ******** ******** ********
|             Record #1: offset             |
******** ******** ******** ********
|             Record #1: depth              |
******** ******** ******** ********
|     Record #1: start pattern index number |
******** ******** ******** ********
|     Record #1: end pattern index number   |
******** ******** ******** ********
|            Record #1: key value           |
******** ******** ******** ********
|                ..........                 |
******** ******** ******** ********
|          Record #k: primary shift         |
******** ******** ******** ********
|         Record #k: secondary shift        |
******** ******** ******** ********
|             Record #k: offset             |
******** ******** ******** ********
|             Record #k: depth              |
******** ******** ******** ********
|     Record #k: start pattern index number |
******** ******** ******** ********
|     Record #k: end pattern index number   |
******** ******** ******** ********
|            Record #k: key value           |
******** ******** ******** ********
```

Child Node

*Fig. 20*

```
0       8       16      24      32
******* ******* ******* *******
|                              |
******* ******* ******* *******
|                              |
******* ******* ******* *******
|       Algorithm code (type)  |
******* ******* ******* *******
| SRAM address of pattern structure info. |
******* ******* ******* *******
|   'Spanning pattern check' policy   |
******* ******* ******* *******
```

Condition Action Rule

*Fig. 21*

MULTI-PATTERN PACKET CONTENT INSPECTION MECHANISMS EMPLOYING TAGGED VALUES

CROSS-REFERENCE TO RELATED APPLICATIONS

This is a Continuation of U.S. application Ser. No. 11/173,036, filed Jun. 30, 2005.

FIELD OF THE INVENTION

The field of invention relates generally to network equipment and, more specifically but not exclusively relates to techniques for performing packet content inspection using tagged values.

BACKGROUND INFORMATION

Enterprise networks are threatened with a variety of security issues on a daily basis. These threats can be either internal or external. Internal threats range from break in attempts by disgruntled employees, virus or worms let loose by employees or just employee network access behavior deemed unacceptable per enterprise security policies. External threats range from dedicated attacks on the enterprise network in an attempt to steal intellectual property, denial of service attacks, unauthorized intrusions, viruses and worms etc. In all of these cases, a packet firewall is a network administrator's primary form of defense.

Packet firewalls sit inline with network traffic, intercept incoming packets, and verify each packet against a set of firewall rules to accept, reject and optionally log the packet. In addition to packet filtering, network administrators sometimes also use packet filters to enforce traffic management policies. Such policies are useful in limiting or controlling offensive behavior. Due to the fact that packet firewalls sit inline with and inspect all network traffic, it is important that the firewall should be able to provide sufficient network throughput to keep up with network traffic demands. In today's enterprise networks, firewall rules are typically limited to 2500 Cisco ACL (access control list) rules These rules are fairly specific, and are designed to allow or reject specific activities or hosts. The ACL rules are limited to this number for performance and manageability reasons. The number of rules directly affects router performance, hence these rules are maintained at a low number. Moreover, large number of rules also makes rules management more error-prone and difficult to verify or modify. In a large organization, the rules are distributed across firewalls in various sites, and adapted as necessary, increasing chances of an error. For these reasons, the number of rules must be maintained at a manageable level.

Under a typical advanced firewall implementation, two levels of filtering are employed. At the first level, filtering is performed based on applicable ACL rules. In this instance, a highest-priority rule corresponding to the ACL database is identified based on the packet header information. For example, the rule may be identified based on a five-tuple input corresponding to values for the source and destination addresses, source and destination ports, and protocol using well-known classification algorithms. Since many attacks (particularly denial of service attacks) will originate from a known source address using a particular port, packets corresponding to these attacks can be readily identified, and appropriate rules (e.g., drop packet) may be employed to effect a desired firewall policy. This first level of filtering can be implemented at line-rate speeds using modern networking equipment. Under some implementations, dedicated components or separate computers are employed for performing these filtering operations.

The second level of filtering relates to packet inspection. In this case, the actual packet payload is searched for a particular string or set of strings. For example, the firewall applications may need to search for certain strings indicative of a virus or Internet worm that is present in the packet. In addition, other non-security applications may likewise need to peek into the packet payload, such as for load balancing or billing purposes. These operations, known as "content inspection" or "(deep) packet inspection," involve inspecting the packet payload for candidate patterns and taking actions based on the presence or absence of these patterns.

Under some firewall implementations, packet/content inspection is off-loaded to a separate application or subsystem that does not support line-rate speeds. For example, these operations may be performed by a separate computer host or embedded general-purpose processor coupled to or provided by a network device. Since the operations are not performed at line-rate (and thus not restricted to corresponding processing latencies), they can employ larger but slower, less-expensive memory (e.g., DRAM (dynamic random access memory)), and employ conventional string search techniques.

Network processors (also referred to as network processor units (NPUs)) are increasingly being used in a variety of networking equipment due to their cost effectiveness, processing speed, flexibility, and upgradeability. In constructing next-generation networking platforms, it is desirable that robust firewall functionality be added without requiring the addition of specialized firewall components, instead utilizing network processor technology and adding firewall functionality to NPU code in a reusable, scaleable fashion.

Content inspection is a resource intensive activity as it involves scanning the entire packet payload for a set of patterns. The inspection algorithms consume significant amount of memory bandwidth as well as compute resources, significantly impacting overall performance. The performance of content inspection algorithms can be improved if we reduce the amount of data scanned in a packet. One technique of reducing the amount of data scanned is to use heuristics information associated with patterns. In many cases, a pattern in a packet would have special significance only if it is present in certain portion of a packet. For example, if the content inspection module is scanning for a URL, then the approximate location where the URL string would be valid in a packet can be specified a priori. The information that can be used to restrict the packet search space is offset and depth. The offset parameter indicates the starting position in the packet that a string should be searched from and the depth parameter indicates the ending position in the packet until which the string should be searched. The offset and depth are typically specified for individual strings. However, content inspection systems need to simultaneously search for multiple patterns in a packet. Under conventional techniques, this cannot be done at line-rate speeds and it scalability is limited.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2 is a schematic diagram illustrating a software block architecture for implementing aspects of the embodiments of the invention described herein;

FIG. 9 is a flowchart illustrating content inspection operations that employ offset and depth search information;

FIG. 10 shows a goto function, and failure function, and an output function corresponding to an exemplary AC state machine data structure;

FIG. 11 shows one embodiment of a pattern data structure to be stored in memory;

FIG. 12 shows one embodiment of an AC machine node memory data structure;

FIG. 13 shows one embodiment of an AC machine index memory data structure;

FIG. 14 shows one embodiment of a DAWG data structure to be stored in memory;

FIG. 15 shows one embodiment of a suffix tree memory data structure;

FIG. 16 shows one embodiment of a SHIFT table memory data structure;

FIG. 17 shows one embodiment of a HASH table memory data structure;

FIG. 18 shows one embodiment of a PREFIX table memory data structure;

FIG. 19 shows one embodiment of a root node memory data structure;

FIG. 20 shows one embodiment of a child node memory data structure; and

FIG. 21 shows one embodiment of a condition-action rule memory data structure.

DETAILED DESCRIPTION

Figure 1:
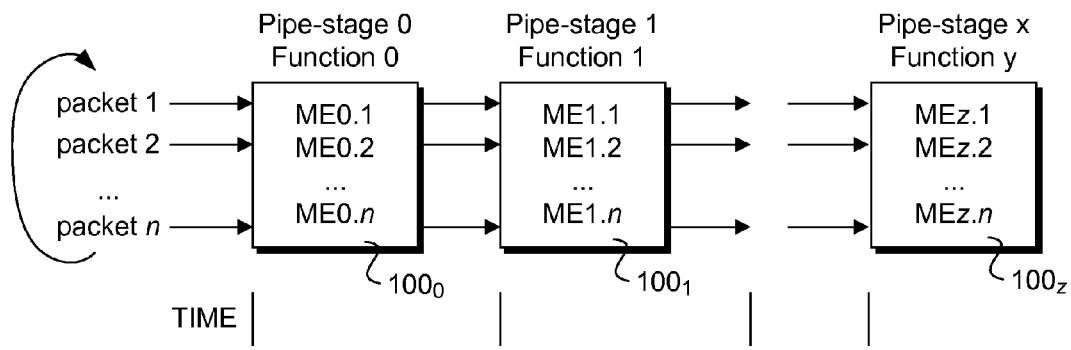
FIG. 1 is a schematic diagram illustrating a technique for processing multiple functions via multiple compute engines using a context pipeline.

Embodiments of methods and apparatus for performing string searches using tagged offset and depth information for multi-pattern searches are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments described herein, mechanisms are disclosed that facilitate content inspection using offset and depth tag values for multi-pattern searching while maintaining line-rate speeds and providing scalable solutions. These mechanisms employ state-based content inspection algorithms that allow content inspection to stop and restart at packet boundaries, while maintaining information about the results of partial string searches. At the same time, the mechanisms can be implemented with minimal buffering, while supporting line-rate speeds using NPUs. In order to better appreciate and understand the implementation of the mechanisms on modern network processors, a description of typical pipelined-based NPU processing operations is first described. Following this, details of the various embodiments are discussed.

Modern network processors, such as Intel's® IXP2xxx family of network processors, employ multiple multi-threaded processing elements (e.g., microengines (MEs)) to facilitate line-rate packet processing operations. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are generally referred to as "packet processing" operations.

Some of the operations on packets are well-defined, with minimal interface to other functions or strict order implementation. Examples include update-of-packet-state information, such as the current address of packet data in a DRAM buffer for sequential segments of a packet, updating linked-list pointers while enqueuing/dequeuing for transmit, and policing or marking packets of a connection flow. In these cases, the operations can be performed within the predefined cycle-stage budget. In contrast, difficulties may arise in keeping operations on successive packets in strict order and at the same time achieving cycle budget across many stages. A block of code performing this type of functionality is called a context pipe stage.

In a context pipeline, different functions are performed on different microengines (MEs) as time progresses, and the packet context is passed between the functions or MEs, as shown in FIG. 1. Under the illustrated configuration, z MEs $100_{0-z}$ are used for packet processing operations, with each ME running n threads. Each ME constitutes a context pipe stage corresponding to a respective function executed by that ME. Cascading two or more context pipe stages constitutes a context pipeline. The name context pipeline is derived from the observation that it is the context that moves through the pipeline.

Under a context pipeline, each thread in an ME is assigned a packet, and each thread performs the same function but on different packets. As packets arrive, they are assigned to the ME threads in strict order. For example, there are eight threads typically assigned in an Intel IXP2800® ME context pipe stage. Each of the eight packets assigned to the eight threads must complete its first pipe stage within the arrival rate of all eight packets. Under the nomenclature illustrated in FIG. 1, MEi.j, i corresponds to the ith ME number, while j corresponds to the jth thread running on the ith ME.

A more advanced context pipelining technique employs interleaved phased piping. This technique interleaves multiple packets on the same thread, spaced eight packets apart. An example would be ME0.1 completing pipe-stage 0 work on packet 1, while starting pipe-stage 0 work on packet 9. Similarly, ME0.2 would be working on packet 2 and 10. In effect, 16 packets would be processed in a pipe stage at one time. Pipe-stage 0 must still advance every 8-packet arrival rates. The advantage of interleaving is that memory latency is covered by a complete 8-packet arrival rate.

According to aspects of the embodiments now described, novel content inspection schemes and mechanisms are implemented using NPUs that employ multiple multi-threaded processing elements. The schemes are implemented via a context pipelining technique under which content inspection of respective packets assigned to a common flow are performed using different instruction threads executing on one or more compute engines (e.g., microengines). To facilitate the schemes, content inspection state information is maintained in data structures that are accessible to the instruction threads and compute engines. For example, a first thread executing on a first compute engine is used to perform a string search on a first of multiple packets that collectively contain a string that matches a candidate pattern, yet is not contained entirely within a single packet (i.e., respective portions of the string are contained in respective packets). The first thread maintains state information pertaining to the string search, with corresponding information identifying a partial match when the end of the first packet is encountered. Meanwhile, a second thread executing on either the same or a different compute engine is employed to perform a string search on a second packet that contains the remaining portion of the candidate pattern at its beginning. The second thread employs the state information generated by the first thread to continue the search at the point the first thread left off. Upon identifying a match, appropriate action may be taken based on corresponding predefined rules or actions (a.k.a. "action targets"). The entire content inspection process is performed in a manner that is parallel with conventional NPU packet-processing operations in a manner that supports line-rate speeds. Furthermore, the mechanism is easily scaled to support large numbers of simultaneous flows.

FIG. 2 shows a high-level view of various components, data structures and process blocks of a software architecture 200 for implementing aspects of packet-processing operations described herein. The components include a Deep Packet Inspector (DPI) module 202, a flow manager module 204, a rules engine module 206, a logger module 208, and a target handler module 210. The data structures include a flow table 212 and rules tables 214. The process blocks include an input verification block 216, a flow validation block 218, a rule match block 220, a log exception block 222, an exception generation block 224, a policy performance block 226, and a response generation block 228.

The Deep Packet Inspection module 202 is used to perform various string search operations based on applicable search patterns, as described below in further detail. The flow manager 204 provides an API (Application Program Interface) to access and manage flow table 212. The rules engine 206 provides an API to the rules table 214, implementing a level of translation. For example, a user specified rule will undergo multiple levels of translations before it gets to a form usable by the fast path (e.g., compute engine) processing code. Rather than embodied as a single module (as shown herein for simplicity) DPI module 202 should be considered as a collection of various protocol-specific functions that are implemented via corresponding threads run on NPU compute engines.

The logger module 208 manages the logging function. This module may either handle logging directly or use services from another component in a different processor (e.g., a general-purpose processor in an NPU or a processor in a separate computer host) to perform the logging function. Typically, the logging function in a firewall might range from simple text-based logging to dumping data into relational databases for extensive report generation. Complexity of this module will vary depending on the functionality provided.

As a packet enters the system, it is first verified for protocol conformance, checksum etc., by input verification block 216. Once this sanity check is performed, the flow validation block 218 verifies whether the packet belongs to a known (e.g., existing) flow or requires a new flow. If the packet does not belong to any known flow, a new entry is added to flow table 212, and the packet metadata (e.g., header data) is passed to rules matching block 220. This block will iterate through a set of match structures, evaluating conditions for every match. The target actions are encoded in the packet metadata as they are matched. Thus a packet can have more than one target action associated with it. For example, it might be required to log the packet as well as forward it. Once the packet is matched against the rules, it is passed to the target handler block 210 for further processing. This block performs the actions associated with the packet metadata.

If the incoming packet belongs to a known flow, it is not matched against the access rules again. Instead, it is passed directly to target handler module 210, which performs any necessary processing for the applicable action(s). Actions that need to be performed on the packets of the flow are stored in or otherwise pointed to by the corresponding flow table entry that exists for the flow.

Figure 3:
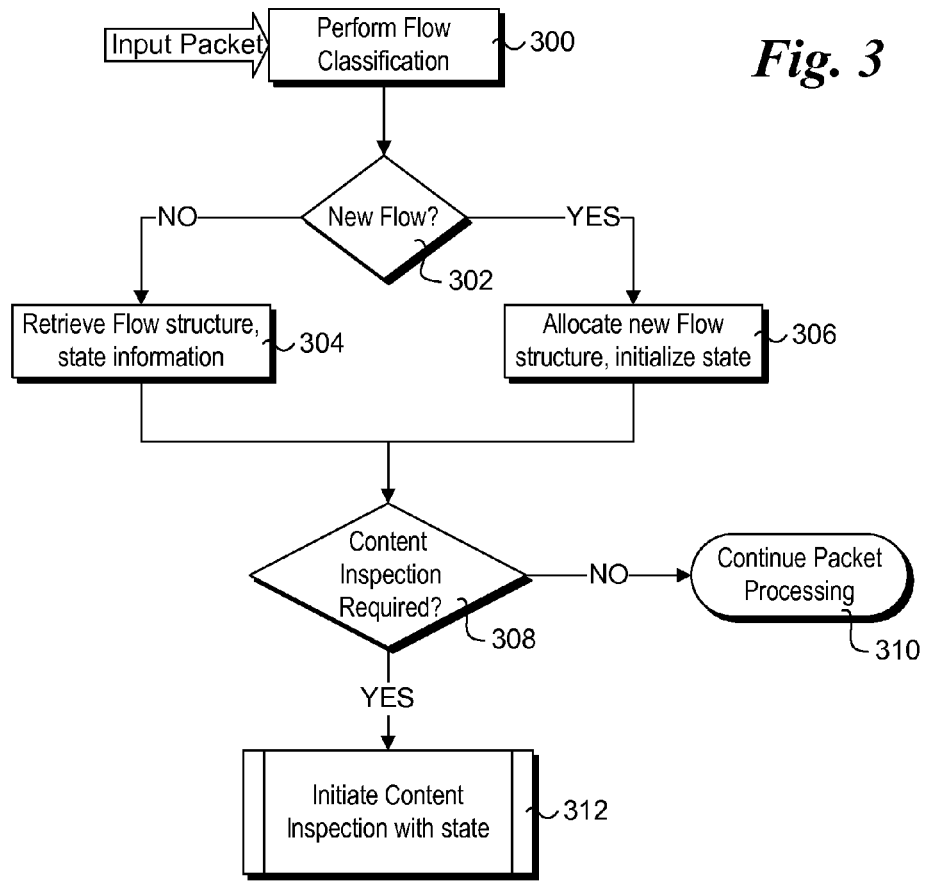
FIG. 3 is a flowchart illustrating operations and logic performed by one embodiment to determine whether content inspection is to be performed on a packet.

With reference to the flowchart of FIG. 3, the following operations are performed during processing of each input packet. The process begins at a block 300, wherein flow classification is performed. In general, flow classification may be performed by one of several schemes that are commonly employed for this purpose. Typically, flows will be classified based on an ACL rule database; however, other classification mechanisms may also be employed. The purpose of flow classification is to assign the packet to a corresponding flow.

Traditionally, the rules for classifying a message (e.g., packet) are called filters (or rules in firewall terminology), and the packet or flow classification problem is to determine the lowest cost matching filter or rule for each incoming message at the network element. The relevant information is contained in K distinct fields in each message (packet). For instance, the relevant fields for an IPv4 packet could comprise the Destination Address (32 bits), the Source Address (32 bits), the Protocol Field (8 bits), the Destination Port (16 bits), the Source Port (16 bits), and, optionally, the TCP flags (8 bits). Since the number of flags is limited, the protocol and flags may be combined into one field in some implementations.

Figure 4A:
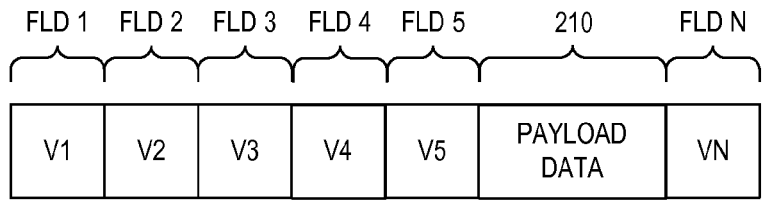
FIG. 4a is shows various parts of a packet that are employed for flow classification.

FIG. 4*a* shows an exemplary packet structure used illustrating a 5-tuple flow classification scheme. In general, this scheme can be extended for any K-tuple classification. Each packet will include various fields in its header, with the number and specific fields being dependent on its transport mechanisms (e.g., TCP/IP packets will have different fields than UDP packets). The packet payload data, also commonly referred to packet data or payload follows the packet header data. An optional packet footer may be included at the end of the packet.

In the illustrated example of FIG. 4a, five fields are selected for perform classification on, as depicted by FLDs 1-5. Each packet field contains a corresponding field value (V1-VN). FLDs 1-5 represent header information, such as source and destination addresses, source and destination ports, protocol information, error checking information, and the like. Payload field 400 defines that portion of the packet containing payload data. Information in the footer, as depicted by FLD N, may also be employed for flow classification in some cases.

Under most classification schemes, only header information is used to perform the classification. However, depending on the particular ACL rules, it may be necessary to include additional information contained in the packet payload and/or footer. For brevity, the following discusses packet classification based on only header information.

When a packet is received, it is parsed to extract selected field values from its header based on the classification scheme. For the illustrated example, these will be values V1-V5 from FLDs 1-5. The extracted field values are then used to search a rule database to determine the set of classification rules that the packet matches, and hence the associated set of resulting flows.

Figure 4B:
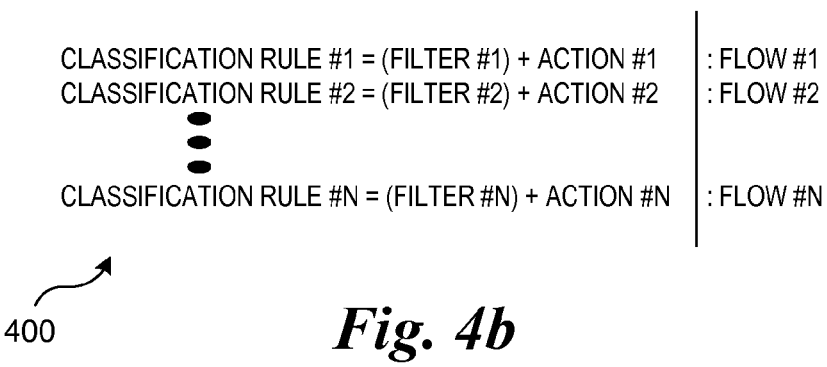
FIG. 4b shows a set of classification rules and associated flows.

As illustrated in FIG. 4b, the filter (ACL) database consists of a finite set of filters, $filt_1$, $filt_2$ ... $filt_N$, with each filter associated with a corresponding classification rule and flow. Each filter is a combination of K values, one for each field (or partial field) applicable to the classification scheme. Each field in a filter is allowed three kinds of matches: exact match, prefix match, or range match. In an exact match, the header field of the packet should exactly match the filter field. In a prefix match, the filter field should be a prefix of the header field. In a range match, the header values should like in the range specified by the filter. Each filter $filt_i$ has an associated directive (i.e., action), which specifies how to handle a packet matching the filter.

In general, classification rule matching may be performed using one of many known techniques. For example, under one embodiment an aggregated bit vector scheme is employed, in which each field value is associated with a corresponding bit vector identifying matching rules in the ACL table. (In practice, the bit vectors are stored using an aggregated or hierarchical scheme to reduce the storage size of each bit vector, since many if not most of the bit values will be 0's, indicating no match.) The bit vectors are then logically ANDed, with the result identifying the matching rules. The highest-priority matching rule may then be easily identified. Other schemes, such as but not limited to Recursive Flow Classification (RFC) (Pankaj Gupta and Nick McKeown, *Packet Classification on Multiple Fields*, ACM SIGCOMM 1999) may also be employed Returning to FIG. 3, once the packet as been classified to a flow, a determination is made in a decision block 302 to whether a corresponding flow data structure (i.e., flow table entry) exists in flow table 212. If a flow table entry already exists, the logic proceeds to a block 304 in which the flow structure and corresponding state information is retrieved. If a flow table entry does not already exist, a new flow structure is allocated in the flow table, and its state is initialized, as shown in a block 306. Further details of the flow data structure and state information are discussed below.

Figure 5:
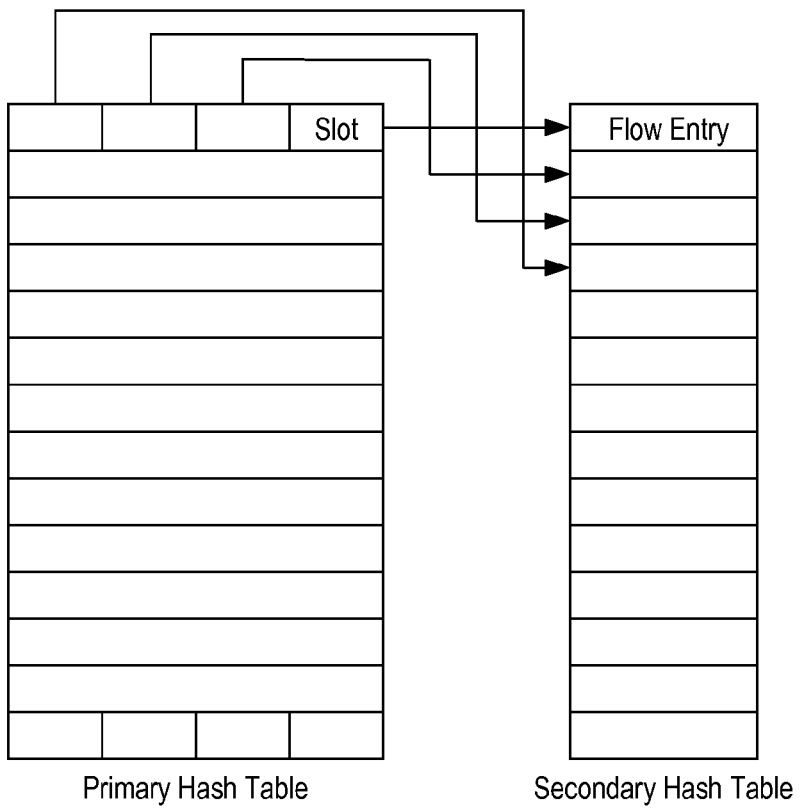
FIG. 5 is illustrates one embodiment of a hash table lookup scheme employing primary and secondary hash tables.

In one embodiment, the flow table entries are maintained in a hash table that uses a double hashing scheme. As shown in FIG. 5, the hash table is organized as two tables, a primary table maintained in SRAM (synchronous random access memory) and a secondary table maintained in the DRAM (dynamic random access memory). The primary table is divided into a set of slots, while each slot entry corresponds to a flow entry in the secondary table. The primary table is indexed by two indices: the first value identifies the slot word (a slot is an 8 bit value −7 bits of signature and 1 flag bit), while the second value (the signature) is stored in the slot and is used to identify the slot. The flow entry in the secondary table is indexed by the slot word index and the slot number with a matching signature value. The flow table is maintained as two sets of hash table; if a search for a flow entry in the first table fails, a search of that entry in the second table is performed.

Depending on the associated flow, content inspection may or may not be required. For example, packets that are sent from a "trusted" source address or sent to a particular destination port may be deemed by the rule database as trustworthy and assigned to a corresponding trusted flow having an associated policy (i.e., action) of "forward." In contrast, packets sent for an untrusted source address might be assigned to an untrusted flow that has an associated policy of "drop." In other cases, the flow may have an associated policy of "inspect content," which requires content inspection to be performed. As depicted by a decision block 308, if content inspection is required, content inspection operations are initiated with the retrieved state information in a block 312. For packets for which content inspection is not required, continuation of packet processing is performed, as depicted by a continuation block 310.

Overall, the implementation of the search mechanism involves two phases: a build or pre-process phase and a run-time phase. During the build phase, various data structures and tables are built and saved to be later stored in memory during associated initialization operations. During the run-time phase, which is generally ongoing, searching is performed on received packets using the data structures and tables.

Figure 6:
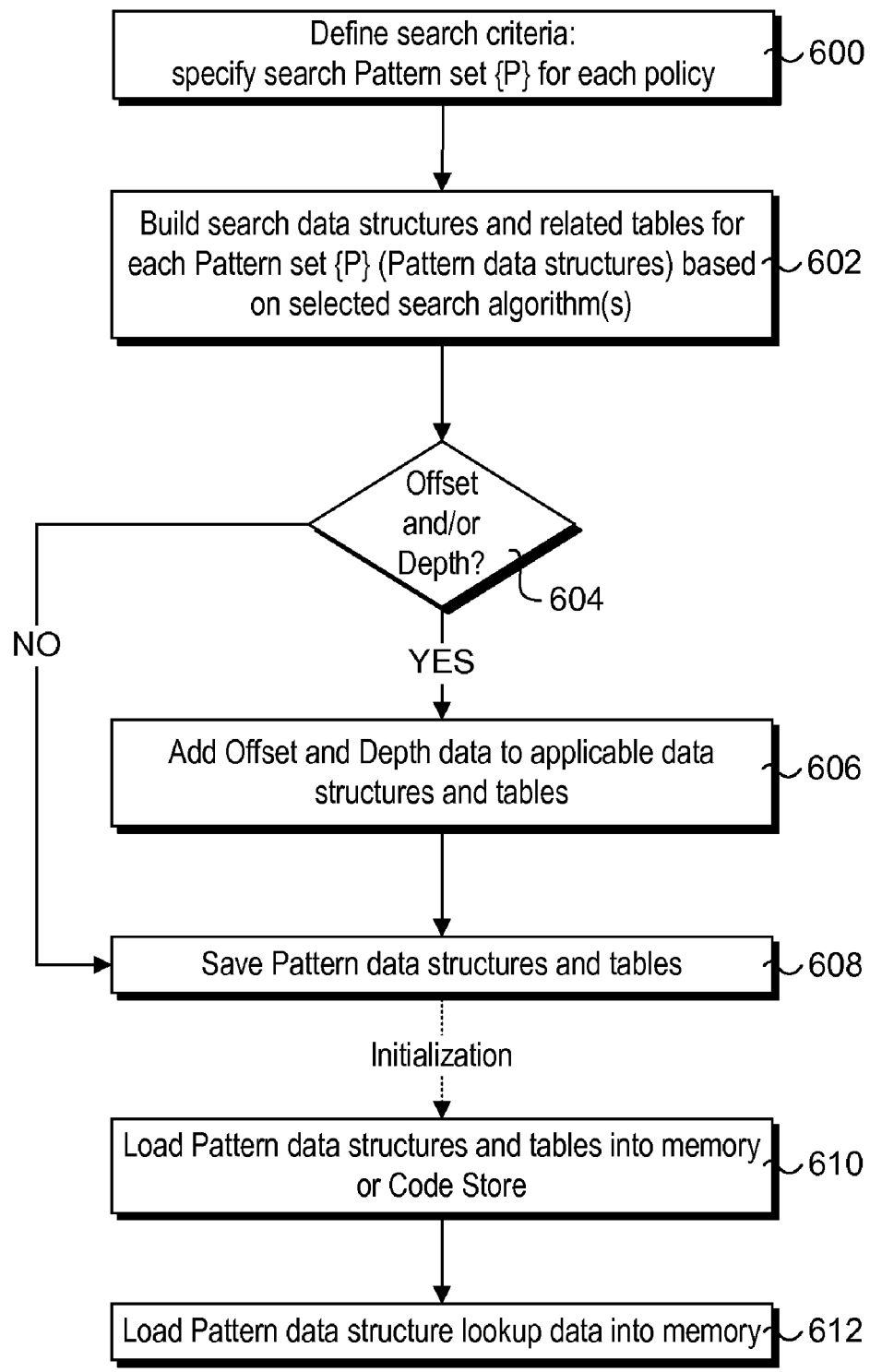
FIG. 6 is a flowchart illustrating operations and logic performed during pre-processing operations to generate pattern data structures.

Details of one embodiment of the build phase are shown in FIG. 6. The process begins in a block 600, wherein the search criteria are defined. This can be stated in a very general way as the problem of searching for the occurrence of a pattern (string) within another string (packet data in this instance). This problem is identical to the classic string-matching problem, which is stated in formal terms as:

Given a text string T of 'n' characters and a pattern string P of 'm' characters, find the positions of all occurrences of P in T.

In the context of firewall use, the above problem can be mapped to the problem of finding the presence of a virus or worm signature, protocol command or the name of a known executables in packet data. It will usually be sufficient to just search for the presence of P in T, rather than to find all occurrences (which does not really mitigate the problem, given that finding the first occurrence is usually as "hard" as finding multiple occurrences, in theoretical terms). In most practical firewall and IDS applications, the signature string to search for may not be known beforehand; the best that can be done is to narrow the field down to a set of patterns that need to be search for, in the context of a particular flow. Therefore, a more general problem is to search for occurrences of any, or all, of a set of patterns {P} within a given text T.

Sometimes, the exact string, or strings, to be matched will not be known beforehand. Signatures can also occur in morphed forms, where the morphing is usually a small change to the original pattern. In such cases, there is a need to handle approximate matching of strings also. Sometimes there may also be a need to match regular expressions instead of known strings. Techniques for all of these are currently being employed in data mining and search applications. In general, these algorithms are somewhat more complicated than the simple string searching one, and have higher memory and cycle requirements.

In the context of the aforementioned policies (conditions), different pattern sets {P} may apply to different policies. For example, certain flows may only need to be searched for a particular pattern set, while other flows may include searches for broader or entirely different pattern sets. Accordingly, an appropriate pattern set is specified for each policy. In general, and depending on the search algorithm that is employed, the pattern sets may include exact matches and/or approximate matches (e.g., matches using wildcard characters).

Next, in a block 602, data structures and related tables (collectively referred to as pattern data structures (DS) are built based on the selected search algorithm(s) to be employed. This aspect is covered in further detail below.

As depicted by a decision block 604, offset and or depth information may also be associated with the search criteria. Oftentimes, more information is known about a particular pattern than just the string of bytes it is comprised of. Such information may help narrow down the region in the packet (or associated bit stream) where the pattern could occur. As used herein, this information includes the Offset and Depth. The Offset value indicates the number of bytes that can be skipped from the beginning of a packet (or bit stream) before starting the search. The Depth value indicates the maximum number of bytes within the packet (or bit stream) that need to be searched to have a chance of finding the pattern. The Offset and Depth values are also referred to as "Tagged" values.

Although such information is very useful where a single pattern is concerned, it is a little more difficult to extend it to the multi-pattern case where each pattern might have a different offset and depth. The naïve method of using this information would be simply to check these tagged values whenever we reach an accepting state in the applicable state machine, but this would be both inefficient and wrong; if the offset or depth does not match when we reach an accepting state, we could have potentially missed other (valid) patterns by going off on a different path (in the machine). Therefore, we need to incorporate offset and depth checks at every step of the algorithm, so that the correct state transitions are made. One way this is achieved is by incorporating (e.g., adding) appropriate tagged value information in the applicable Pattern data structures, as depicted in a block 606 and explained in further detail below. After the pattern data structures are fully built, they are saved to a file or the like in a block 608. During subsequent initialization operations, the pattern data structures will be loaded into memory and/or code stores, and corresponding pattern data lookup data will be loaded into memory, as depicted by respective blocks 610 and 612.

Figure 7:
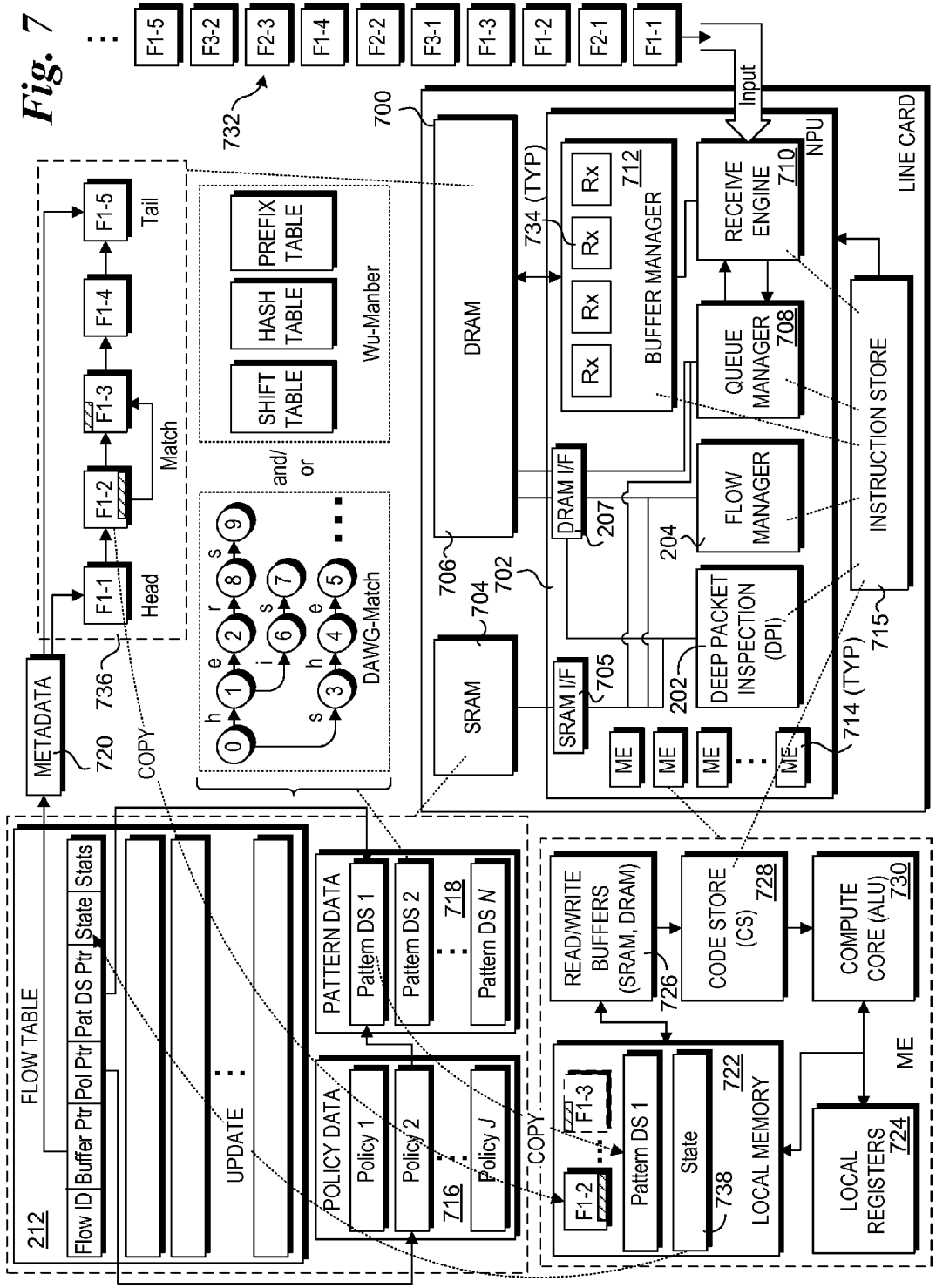
FIG. 7 is a schematic diagram illustrating data flows and functional blocks employed by a network line card including an NPU having multiple compute engines used to execute instruction threads to perform packet processing operations including content inspection.

To illustrate how and where this data might be stored, attention is directed to the execution environment illustrated in FIG. 7. The execution environment pertains to a network line card 700 including an NPU 702 coupled to an SRAM store (SRAM) 704 via an SRAM interface (I/F) 705, and coupled to a DRAM store (DRAM) 706 via a DRAM interface 707. Selected modules are also depicted for NPU 702, including a deep packet inspection module 202, a flow manager module 204, a queue manager module 708, a receive engine 710, and a buffer manager 712. In the manner described above, the operations associated with each of these modules are facilitates by corresponding instruction threads executing on MEs 714. In one embodiment, the instruction threads are initially stored in an instruction store 715 comprising a non-volatile storage device, such as flash memory or a mass storage device or the like.

As illustrated in FIG. 7, various data structures and tables are stored in SRAM 704. These include a flow table 212, a policy data structure table 716, and a pattern data structure table 718. Also, packet metadata 720 is typically stored in SRAM as well. As described above with reference to FIG. 5, respective portions of a flow table may be split between SRAM 704 and DRAM 706; for simplicity, all of the flow table 212 data is depicted in SRAM 704 in FIG. 7.

Typically, information that is frequently accessed for packet processing (e.g., metadata 720) will be stored in SRAM, while bulk packet data (either entire packets or packet payloads) will be stored in DRAM, with the latter having higher access latencies but costing significantly less. Accordingly, under a typical implementation, the memory space available in the DRAM store is much larger than that provided by the SRAM store.

As shown in the lower left-hand corner of FIG. 7, each ME 714 includes a local memory 722, local registers 724, separate SRAM and DRAM read and write buffers 726 (depicted as a single block for convenience), a code store 728, and a compute core (e.g., Arithmetic Logic Unit (ALU)) 730. In general, information may be passed to and from an ME via the SRAM and DRAM write and read buffers, respectively. In addition, in one embodiment a next neighbor buffer (not shown) is provided that enables data to be efficiently passed between ME's that are configured in a chain or cluster.

As describe below, each pattern data structure will provide information for effectuating a corresponding state machine or table-based machine. The various pattern data structures will typically be stored in pattern data structure table 718, as illustrated in FIG. 7. However, there may be instances in which selected pattern data structures are stored in selected code stores that are configured to store both instruction code and data.

As described above for FIG. 6, in addition to storing the pattern data structures, associated pattern data structure lookup data is likewise stored in block 612. In the embodiment illustrated in FIG. 7, the lookup data is stored as pointers associated with a corresponding policy in the policy data structure table 716. Other schemes may also be employed. The pattern data structure lookup data is used, in part, to build flow table entries in the manner described below.

Figure 8A:
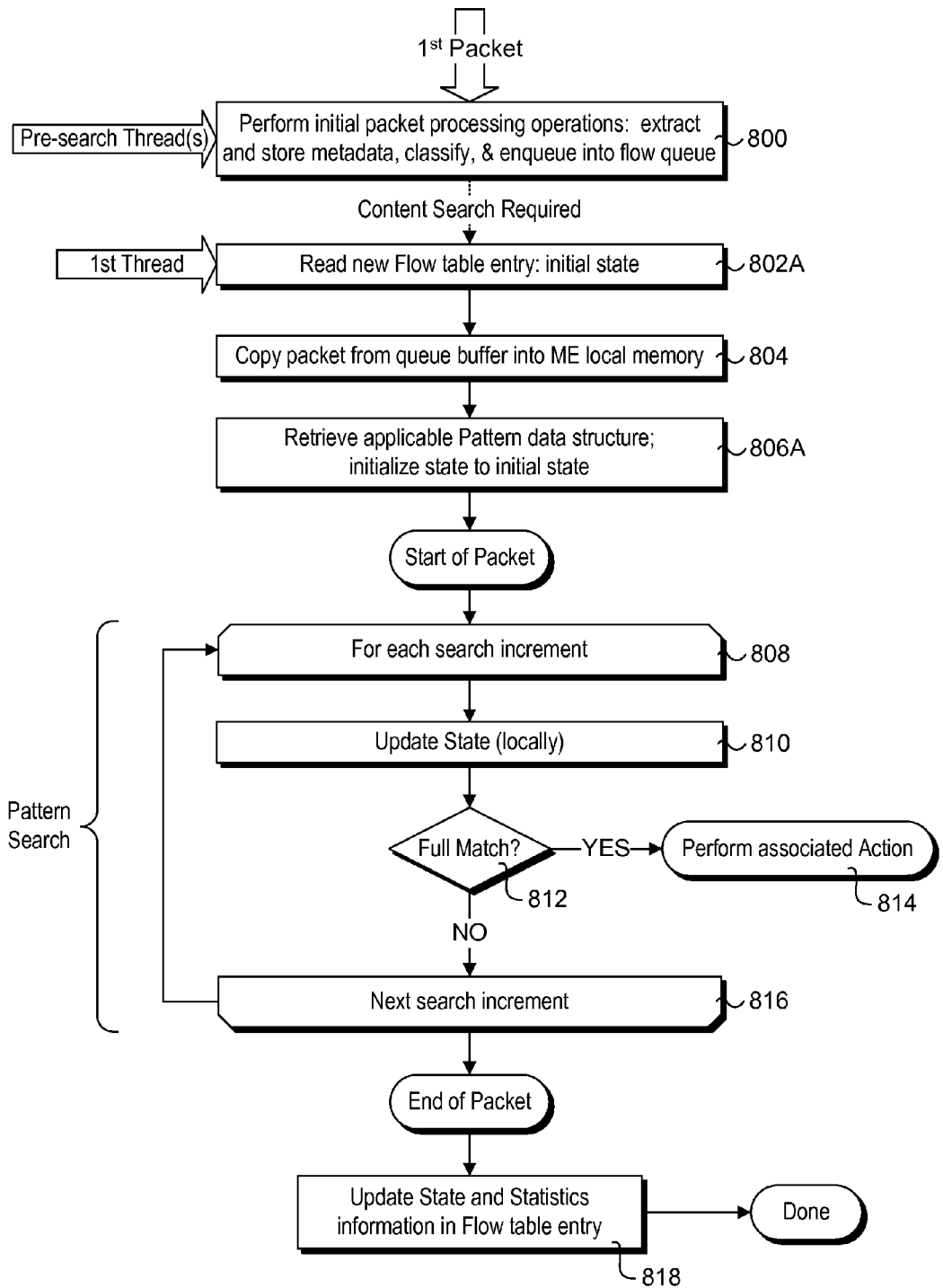
FIG. 8a is a flowchart illustrating operations and logic performed during content inspection of a first packet in a flow.
Figure 8B:
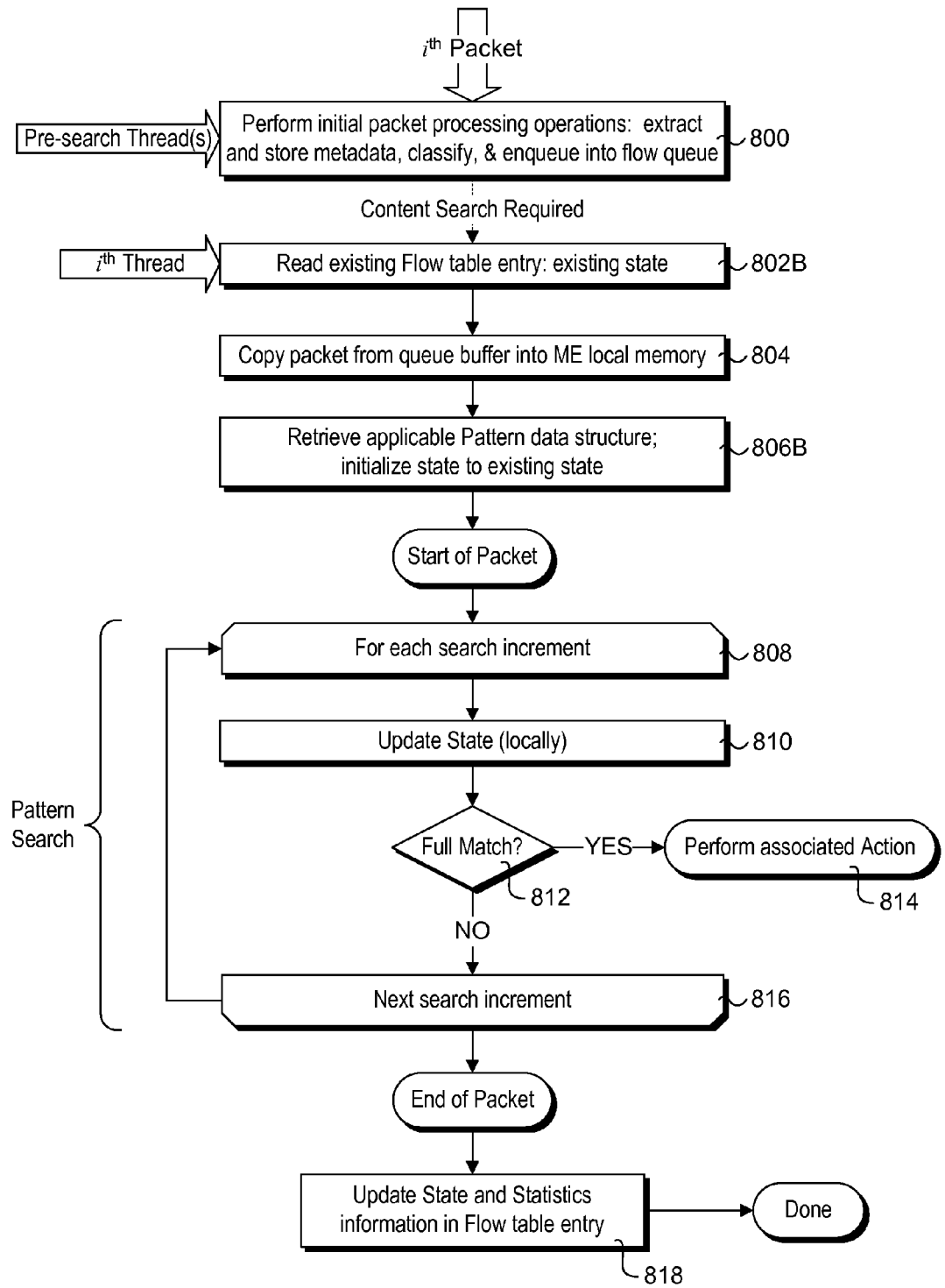
FIG. 8b is a flowchart illustrating operations and logic performed during content inspection of packets other than a first packet in a flow.

An overview of operations performed during the run-time content inspection phase are illustrated in FIGS. 8a and 8b, wherein FIG. 8a depicts operations performed during processing of a first packet in a flow, and FIG. 8b depicts operations performed during processing of any subsequent packet in the flow (as depicted by the $i^{th}$ packet). As shown in a block 800 in each of FIGS. 8a and 8b, in response to receiving an input packet initial packet processing operations are performed via execution of one or more threads on one or more MEs 714. To distinguish these threads from other threads used for content inspection, the threads are labeled pre-search threads in FIGS. 8a and 8b.

In further detail and with reference to FIG. 7, as input packets 732 are received at line card 700, they are processed by receive engine 710, which temporarily stores them in receive (Rx) buffers 734 in association with ongoing context pipeline packet processing operations. The packet headers are extracted, and corresponding packet metadata 720 is stored in SRAM 704. The packets are also classified in the manner discussed above, and assigned to existing or new flows. Each flow has an associated queue that is stored in DRAM 706, as depicted by a flow queue 736. The queues are generally managed by queue manager 708 and/or flow manager 204. Upon creation of a flow queue, associated information is added to metadata 720, such that the first (head) and last (tail) packet in the queue can be readily identified for subsequent operations, such as dequeuing.

Packet streams are received from various network nodes in an asynchronous manner, based on flow policies and other criteria, as well as less predictable network operations. As a result, on a sequential basis packets from different flows may be received in an intermixed manner, as illustrated in FIG. 7. For example, each of input packets 732 is labeled with F#-#, wherein the F# identifies the flow, and the -# identifies the sequential packet for a given flow. As will be understood, packets do not contain information specifically identifying the flow to which they are designed, but rather such information is determined during flow classification. However, the packet sequence data is provided in applicable packet headers, such as TCP headers (e.g., TCP packet sequence #). In FIG. 7, flow queue 736 contains the first five packets in a Flow #1. As before, packets are added to associated flow queues after they have been classified during enqueuing operations performed in block 800.

Following the operations of block 800, operations analogous to those shown in FIG. 3 will be performed, resulting in a content search being required. As discussed above, if the packet is assigned to a new flow, a corresponding flow table entry will be created in block 306. In the embodiment illustrated in FIG. 7, each flow table entry includes a flow ID, a buffer pointer, a policy pointer, a pattern data structure pointer, state information, and statistics information. (A flow table entry may also include other information that is not shown.) The flow ID is used for flow table entry lookup, and in one embodiment comprises a hash index in accordance with the flow table index scheme shown in FIG. 5. In one embodiment, the buffer pointer points to applicable metadata 720, which in turn includes pointers to the head and tail packets in the flow queue associated with the flow table entry. The policy pointer points to a policy data structure in policy data structure table 716. As discussed above, each flow is associated with a policy. During flow classification, the policy is identified, and a corresponding policy pointer is provided to flow manager 204.

As discussed above, each policy that requires content inspection is also associated with a pattern data structure. Thus, in one embodiment, the pattern data structure pointer may be extracted from the policy data structure.

The state information is used to store the state of a corresponding algorithm state used by deep packet inspection module 202, and is described in further detail below. The statistics information is used for various purposes, including identifying the current sequence number of the last packet in the flow for which content inspection was completed. In this manner, the next packet to be inspected for a given flow may be identified based on its relative location to the head packet in an associated flow queue.

As shown in a block 802A of FIG. 8a, if the packet is the first packet in the flow, a first thread will be launched on an ME 714 to perform a pattern search of the packet to identify any matches in view of the applicable pattern set {P}. Accordingly, data corresponding to the new flow table entry for this packet is read by the thread, including the state information, which will indicate the state machine is in the initial state. In a block 804, the location of the packet in the associated flow queue is identified using the buffer pointer and metadata, and the packet is copied to local memory 722 of the ME. In a block 806B, the applicable pattern data structure (as identified by the pattern data structure pointer) is retrieved from pattern data structure table 718 and copied into local memory 722. The existing state 738 of the corresponding search algorithm is initialized to the initial state, which indicates no partial matches currently exist.

The pattern search operations begin at the start of the packet (e.g., start of the packet payload data) and is performed in an iterative manner until the end of the packet is reached. As depicted by start and end loop blocks 808 and 816, the applicable algorithm machine employs a search increment that may comprise one or more characters, depending on the particular search algorithm. In response to each increment, the existing state 738 of the machine is updated, as applicable. In a block 812, a determination is made to whether a full match has been identified by the machine. If so, the associated action for the search condition is performed, as depicted by a continuation block 814, and the thread is terminated.

In general, the associated action may be performed by the same or another (more likely) thread on the same or another ME. Optionally, the associated action may be performed by the NPU's general-purpose processor (not shown in Figure for clarity). In the case that the matching string identifies the existence of a malicious worm or the like, the associated action will typically be to drop all remaining packets in the flow, and to possibly update the ACL database action for the source address. Dropping the remaining packets may be accomplished by updating the policy pointer in the associated flow table entry such that the policy for the flow is effectively switched from "inspect content" to "drop."

Once the pattern search algorithm reaches the end of the packet (without a match), the state and statistics information in the associated flow table entry is updated in a block 818. At this point, execution of the first thread is terminated.

Turning to FIG. 8b, upon receipt of the subsequent packets classified to the same flow, similar operations are performed, as indicated by like-numbered blocks in FIGS. 8a and 8b. At a block 802B, an ith thread is launched on the same or another ME 714, wherein i represents the packet sequence number (normalized from the actual sequence number in the header). After processing the first packet, the flow table entry that is read will be an existing entry that includes an existing state that was updated by the previous packet. As before, the flow table entry information, including the statistics, is used to locate the packet in the flow queue, whereupon it is copied to the ME's local memory 722 in block 804.

At block 806B, the applicable pattern data structure is retrieved by the ME in a manner similar to block 806A of FIG. 8a. However, as a result of processing the previous packet (e.g., the first packet), the state of the machine will be initialized to the existing state updated by that previous packet. If a partial match was present at the end of the previous packet, the existing state will be somewhere in the machine other than the initial state (e.g., 0). If no partial match was present, the existing state will be the initial state.

The pattern search operations of blocks 808, 810, 812, 814, and 816 are preformed in a similar manner as applied to the first packet, with the only difference being the initial state of the machine. Accordingly, if a partial match existed at the end of the previous packet, the pattern search is began at the point the state machine left off, looking for the second portion (the remaining matching portion) one or more strings in the pattern set {P} (depending on the existing state). As before, if a full match is identified, the associated action is performed in continuation block 814.

As discussed above, the search criteria may specify offset and depth values for respective pattern strings. In this case the pattern search processing is augmented to account for this additional search information. As shown in FIG. 9, we begin at the start of a packet, with the prior operations of FIG. 8*a* or 8*b* (as applicable) having already been performed. At a block 900, a portion of the packet is skipped to reach the offset, at which point the search will begin. In further details discussed below, this operation may be implemented on an individual pattern search basis, such that some patterns are offset at different points than others when a multi-pattern search is employed. If the packet is a first packet in a flow, the number of bytes corresponding to the offset will be skipped from the beginning of the packet.

It is theoretically possible that the offset for one or more search patterns will be greater than the entire length of the first packet. Accordingly, in this case, the entire packet is skipped for those search patterns, and the length of the first packet will be deducted from the offset value, such that the portion of the offset to be skipped for the following packet will consider how much of the bit stream will have been already skipped. For example, consider a case in which the offset for a particular search pattern is greater than the maximum size of the packet payload for a give protocol. For this particular search pattern, the entire first packet will be skipped, and the search will commence at an offset in the second packet that equals the difference between the original offset and the size of the first packet. In one embodiment, this multi-packet offset scheme may be facilitated by updating appropriate statistics information in the associated flow table entry, as discussed below with reference to block 920.

As depicted by start and end loop blocks 902 and 914, the pattern search involves an iteration over the packet payload data, with the location within the data being advanced by the applicable search increment being employed by the search algorithm. The starting point for each search pattern in pattern set {P} will be the effective offset for that search pattern. In response to moving each search increment, the machine state is updated in a block 904. As indicated by a decision block 906, if a search string match is indicated by the machine, an associated action is performed in a continuation block 908. If no match exists, the logic proceeds to a decision block 910 to determine whether the depth for the applicable search string has been reached. If so, searching for that string is complete, as depicted by an end block 912. If not, the process loops back to start loop block 902 to begin the next iteration.

Upon reaching the end of the packet, two actions may result, depending on the implementation, as depicted by a decision block 916. For embodiments that only search the first packet in a flow, the search process for the flow is complete, with no match being found. As a result, the policy pointer in the flow table entry is updated in a block 918 to point to a policy that does not perform a content search, such that a search is not performed on the remaining packets in the flow. If a multi-packet search (with regard to the offset aspect) is supported, the statistics information is updated in the flow table entry to account for the size of the skipped packet in the offset to be employed for the following packet, as depicted in block 920.

In one embodiment, the effective depth employed for a given search pattern can be adjusted to support multi-packet searches. For example, consider a situation in which the offset is less than the size of a first packet, while the depth is greater than the size of the first packet. This situation may be handled by reducing the depth value that is applied to the second packet by the size of the first packet. This operation may also be performed in block 920. It is further noted that under this scenario, the state information would also be updated in the flow table entry to reflect the state of the state machine at the end of the first packet in the same manner discussed above.

In one embodiment the mechanism for effecting offset and depth operations is provided via data contained in the applicable pattern data structure. Accordingly, a block 922 is included in FIG. 9 to illustrate that the pattern data structure is adjusted to account for the offset and/or depth under the multi-packet implementation. This operation will be performed by another thread (launched to process a next packet in the flow) using the statistics information that was updated in block 920.

Multi-Pattern Search Algorithms

The simplest way of searching for the occurrence of multiple patterns is by iterative application of any of a number of well-known single pattern algorithms for each pattern. A number of multi-pattern algorithms have been proposed since the late 1970s. The FSM (Finite State Machine) algorithms have traditionally been the focus of research, but there are other efficient algorithms that don't use FSMs, like the ones proposed by Wu and Manber.

An FSM algorithm is based on the following considerations. Given a finite alphabet and a pattern, it is possible to construct a finite state automaton in an efficient manner that can process text strings to return occurrences of the pattern. Every state (denoted by a number) in the machine corresponds to the longest prefix of the pattern matched so far. This has the property of needing to scan every character in the text exactly once. The preprocessing mainly involves computing the machine transition function. A run of the algorithm involves feeding the search text into the FSM as input. An occurrence of P is detected whenever an accepting state is reached.

In general, any type of FSM algorithm may be implemented for the pattern searches employed by the embodiments described herein. In order to better understand how an FSM algorithm operates, a brief description of the well-known Aho-Corasick (AC) algorithm (A. V. Aho, M. Corasick, "Efficient string matching: an aid to bibliographic search", *Communications of the ACM*, vol. 18 (1975) 333-340) will now be discussed. The following description is taken from the foregoing document.

Let $K=\{y_1, y_2 \ldots , y_k\}$ be a finite set of strings called keywords and let x be an arbitrary string which we shall call the text string. Our problem is to locate and identify all substrings of x which are keywords in K. Substrings may overlap with one another. A pattern matching machine for K is a program which takes as input the text string x and produces as output the locations in x at which keywords of K appear as substrings. The pattern matching machine consists of a set of states. Each state is represented by a number. The machine processes the text string x by successively reading the symbols in x, making state transitions and occasionally emitting output. The behavior of the pattern matching machine is dictated by three functions: a goto function g, a failure function $f$, and an output function output.

FIG. 10 shows the functions used by a pattern matching machine for the set of keywords {he, she, his, hers}, wherein the states are 0, 1 . . . , 9. The goto function g maps a pair consisting of a state and an input symbol into a state or the message fail. The directed graph represents the goto function. For example, the edge labeled h from 0 to 1 indicates that g(0, h)=1. The absence of an arrow indicates fail. Thus, g(1, σ)=fail for all input symbols σ that are not e or i. All the pattern matching machines have the property that g (0, σ)≠fail for all input symbols σ. This property of the goto function on state 0 ensures that one input symbol will be processed by the machine in every machine cycle. The failure function $f$ maps a state into a state. The failure function is consulted whenever the goto function reports fail. Certain states are designated as output states that indicate that a set of keywords has been found. The output function formalizes this concept by associating a set of keywords (possibly empty) with every state.

computing the transition functions for the AC state machine, a shift table is also computed, which stores the maximal shift at a particular state that guarantees no occurrence of a pattern in the skipped area (the state corresponds to the longest prefix of a pattern matched to a suffix of the text scanned so far); this function corresponds to the Apostolico-Giancarlo skip function. In a step of the algorithm, the DAWG is used to first scan from right to left until a mismatch, upon which the AC machine is used to scan from left to right to recognize prefixes, and decide on the shift value. If the set of character matched using the DAWG overlap with the prefix matched by AC in the previous phase, a match is reported.

One embodiment of the pattern data structure for the DAWG-Match algorithm is presented below, with a corresponding memory data structure shown in FIG. 11.

```
struct Pattern {
    char *string;           /* Pointer to string of bytes */
    int length;             /* Number of bytes in string */
    int offset;             /* string MUST NOT occur within first offset bytes of text */
    int depth;              /* string MUST occur within first depth bytes of text */
    char fcase;             /* Flag (0=case independent; 1=case dependent) */
    struct Pattern *prev;   /* Pointer to previous pattern (for conditional search; search
                               for string only if prev has been found */
    struct Pattern *next;   /* Pointer to next pattern (next must follow string in the text
                               for condition to be satisfied (or modification of a RegEx) */
    int prev_pat_num;       /* Pattern number of prev in a pre-ordered list */
    int next_pat_num;       /* Pattern number of next in a pre-ordered list */
    int distance;           /* Same meaning as offset; start position of text is first byte
                               after end of prev (if found) */
    int within;             /* Same meaning as depth; start position of text is first byte
                               after end of prev (if found) */
    int exact;              /* Exact start position of string in text */
    int relative;           /* Same meaning as exact; start position of text is first byte
                               after end of prev (if found) */
};
```

An operating cycle of a pattern matching machine is defined as follows. Let s be the current state of the machine and a the current symbol of the input string x.

1. If g(s, a)=s', the machine makes a goto transition. It enters state s' and the next symbol of x becomes the current input symbol. In addition, if output(s')≠empty, then the machine emits the set output(s') along with the position of the current input symbol. The operating cycle is now complete.
2. If g(s, a)=fail, the machine consults the failure function $f$ and is said to make a failure transition. If $f$(s)=s" the machine repeats the cycle with s' as the current state and a as the current input symbol.

Initially, the current state of the machine is the start state and the first symbol of the text string is the current input symbol. The machine then processes the text string by making one operating cycle on each symbol of the text string.

DAWG-Match Implementation

In one embodiment, an FSM-based algorithm known as the DAWG-Match algorithm (M. Crochemore, A. Czumaj, L. Gasieniec, T. Lecroq, W. Plandowski, and W. Rytter, "Fast practical multi-pattern matching", *Inf. Process. Lett.,* 71 ((3-4)): 107-113, 1999) is employed. This algorithm combines the ideas of Aho-Corasick with Boyer-Moore to get a better average running time. It requires computation of both an AC state machine as well as a DAWG (Directed Acyclic Word Graph) for the reverse patterns of the given pattern set. While The Prev and Next values will be NULL if not defined. Default values of offset and distance will be 0, unless explicitly defined. Default values of depth, within, exact and relative will be −1, unless explicitly defined. For pre-processing, pointer values prey and next are used. For the algorithm implementation in microcode, prev_pat_num and next_pat_num are employed as pattern index values are used more ubiquitously (actual pattern address can be computed form these values, as pattern structure is of constant size).

In the memory map data structure of FIG. 11, addresses are aligned to word (4 bytes) boundaries. The actual pattern string is a sequence of bytes starting at the byte address indicated in the first field of the data structure. In practice, pattern strings are stored contiguously and immediately after the end of the last pattern data structure. This enables pre-allocation of memory, computation of relative addresses during pre-processing and requires only one pointer (address of first pattern structure) to be maintained.

The AC machine employs a deterministic finite state automaton (Q, δ, $f$, $s_0$, T), where Q is the set of states, δ is the transition function, $f$ is the failure function, $s_o$ is the start state and T is the set of accepting states. The transition function determines which state to move to from a particular state on a given input. The failure function indicates exception transitions, for (state, input) pairs that are not defined by the transition function.

The AC machine is structured as a trie of nodes, and can be specified just by the pointer to the start state. In one embodiment, the follow data structure is employed, while a corresponding memory data structure is shown in FIG. 12.

```
struct transition {
    char input;                      /* Byte value that triggers state transition */
    struct AC_node *destination;     /* Pointer to destination AC-machine state (node) */
};
struct AC_node {
    int node_id;                     /* Unique integer as state id */
    int shift;                       /* Maximum safe shift value (for DAWG-Match):
                                        shift is the minimal distance that can be skipped
                                        with a guarantee that no pattern can occur in the
                                        skipped area */
    int offset;                      /* Prefix indicated by this state must end on or after
                                        first offset bytes of text*/
    int depth;                       /* Prefix indicated by this state must end within depth
                                        bytes of text */
    struct AC_node *fail;            /* Pointer to fail state */
    int num_transitions;             /* Number of transitions from this state */
    struct transition *next;         /* List of transitions from this state, ordered by
                                        ASCII value of input byte */
    char faccepting;                 /* Flag (1 = accepting; 0 = not accepting) */
    int num_outputs;                 /* Number of patterns recognized, if state is
                                        accepting */
    struct Pattern **output;             /* Pattern(s) recognized, if state is accepting */
    int *pattern_numbers;            /* List of patterns recognized, as index values in a
                                        pre-ordered list of patterns */
};
```

The default values of offset, faccepting, num_transitions and num_outputs are 0, unless explicitly defined or calculated. The default value of depth is −1, unless explicitly defined or calculated. Pointers are used for destination, fail and output only during pre-processing (computation of the machine). The microcode implementation uses pattern_numbers and node_id for states (actual memory addresses are computed from these).

In one embodiment, an AC machine index structure is employed, as shown in FIG. 13. Although the index and each of the AC machine nodes are designed to be independently relocatable in memory, it is advantageous to store the state information in contiguous fashion ordered by state ID, and to store the structure information immediately after the index. This allows different addresses (relative) to be computed during pre-processing, reduces the number of pointers to be maintained to one (base address of index structure), and enables pre-allocation of memory.

A directed acyclic word graph, or a suffix automaton, recognizes all suffixes of patterns in a given set (the DAWG-match algorithm takes reversed patterns as input). A DAWG does not have a failure function, and states don't need to have output patterns associated with them. One embodiment of a DAWG data structure is presented below, while a corresponding memory data structure is shown in FIG. 14:

The Default values of flag and num_transitions are 0, unless explicitly specified or calculated. The flag is used only for construction of the DAWG, and has no role to play in actual string matching. Pointers are used for destination only during pre-processing (computation of the machine). The microcode implementation uses node_id for states (actual memory addresses are computed from these). The DAWG machine index structure is identical to the AC machine index structure. The DAWG indices and structures are stored contiguously in a manner similar to that discussed above for the AC machine.

A suffix tree, like a DAWG, recognizes all suffixes of patterns in a given set (the AC-Suffix-Tree algorithm takes reversed patterns as input). This structure is essentially a DAWG unraveled into a tree, thus having a unique path from source to any other state. Details of one embodiment of a suffix tree data structure are provided below, while a corresponding memory data structure is shown in FIG. 15:

```
struct suf_transition {
    char input;                      /* Byte value that triggers state transition */
    char flag;                       /* Flag (0=primary edge; 1=secondary edge) */
    struct DAWG_node *destination;   /* Pointer to destination DAWG state (node) */
};
struct DAWG_node {
    int node_id;                     /* Unique integer as state id */
    int num_transitions;             /* Number of transitions from this state */
    struct suf_transition *next;     /* List of transitions from this state, ordered
                                        by ASCII value of input byte */
    struct DAWG_node *suffix_pointer;   /* Pointer to parent in a virtual tree that is
                                        used for computation of the DAWG */
};
```

```
struct tree_transition {
    char input;                      /* Byte value that triggers state transition */
    struct suffix_node *destination; /* Pointer to destination suffix tree state (node)
*/
};
struct suffix_node {
    int node_id;                 /* Unique integer as state id */
    int num_transitions;         /* Number of transitions from this state */
    struct tree_transition *next; /* List of transitions from this state, ordered
                                      by ASCII value of input byte */
    struct AC_node *ACnode;      /* AC-machine state where scan will end, starting
                                      from the source and the reverse of the pattern
                                      recognized by this suffix tree state as input */
};
```

The Default value of num_transitions is 0, unless explicitly specified or calculated. The ACnode is what differentiates a DAWG and a Suffix Tree. In the latter, each state is reached by a unique path of bytes (substring of a pattern) from the start state. Therefore, each state will have a unique AC machine node representing that traversed string. For example, let state s in the suffix tree be reachable from the start state by a string $c_1 c_2 c_3 \ldots c_n$. Let this string be provided as input to the AC machine. If the AC machine scan stops at a state d, the value of s->ACnode will be set to d. Pointers are used for destination and ACnode only during pre-processing (computation of the machine). The microcode implementation uses node_id for states (actual memory addresses are computed from these). The suffix tree machine employs an index structure that is identical to the AC machine index structure, while the suffix tree indices and structures are stored contiguously in a manner similar to that discussed above for the AC machine.

During pre-processing operations used to build the pattern data structures, the pattern list is scanned for case-independent patterns. In order to keep the state machines deterministic and to be able to recognize such patterns, whatever combinations of case they occur in (within the packet payload), all combinations of byte strings that the particular pattern could occur as are generated in one embodiment. All these new combinations are added to the pattern list, but the prey pointer is used to point to the original pattern, so that memory space is not wasted in storing these exponential numbers of new patterns.

In practice, manual or programmatic selection operations may be employed to generate and/or remove case-independent patterns. For example, while it might be reasonable to store combinations of the basic same character string using all small, and caps, and first letter only capitalization forms, it would typically be far less beneficial to generate forms of the character string that include random capitalization.

The foregoing implementation provides several additions to the basic AC machine construction algorithm as proposed by Aho and Corasick and referenced above, including:

Shift computation: This is necessary for the DAWG-Match algorithm as proposed by Crochemore et al.;

Offset and Depth computation: If patterns have associated offset and depth that are not equal to the default start and end of packet, we need to compute values for each state. If we did not compute these values for each state, we would be making unnecessary state transitions; only when an accepting state was found would we know whether or not the output pattern was valid, and in the process, we might miss some valid patterns; and Incorporating case independent patterns: By computing all possible combinations of strings for case independent patterns, we ensure that a case independent pattern will always be recognized. In one embodiment, the output at any accepting state as the original pattern is marked, rather than having to store unnecessary combinations of patterns.

In view of the embodiments illustrated in FIGS. 6, 7 8a, 8b, and 9 and discussed above, the DAWG and suffix tree algorithms are implemented via execution of microcode threads on selected ME's. In addition to the foregoing description, the operations are summarized as follows. First, an attempt is made to try to match the longest prefix possible of any pattern in the pattern set {P} to a suffix of T. For the DAWG and suffix tree algorithms described above, the prefix value can be represented by an equivalent state of the AC machine that recognizes patterns in the set {P}.

For the first packet in the flow, the prefix of a pattern matched in the previous pattern is the empty string, so the prev_state input will be the start state of the AC machine. If, for any packet, this value is not equal to the start state, the AC machine is used to scan T from its first character in a forward direction, starting from prev_state, till a suitable shift value is obtained and the DAWG can start its scan.

Towards the end of the packet scan, during a loop iteration, a substring of the packet content to be scanned by the DAWG will cross the end of the packet (i.e. pos>=size of packet). When this happens, we need to break form the loop and resume scanning of the packet where the AC machine left off in the last loop iteration (i.e. at the same state and the same character position in the packet). The AC machine scan continues until the end of the packet is reached, at which point, the AC machine state is recorded as the prev_state in the associated flow table entry, which is employed to initialize the state for processing the next packet in the sequence.

This mechanism for detecting patterns spanning multiple packets will work only if packets of the flow arrive in sequence. The prev_state value makes sense only if the current packet has a sequence number that is one higher than the packet that arrived previously in the flow. If packets don't arrive in order (this applies to TCP and other connection-oriented protocols), such pattern detection cannot be performed just by storing one prev_state value in the flow entry. This problem may be addressed for some situations by storing multiple instances of such state values, along with associated packet sequence numbers. However, this solution does not work if a packet arrives whose previous packet in sequence has not been scanned (this is because the nature of our machine data structures makes it difficult to detect pattern suffixes at the beginning of packets; detecting pattern prefixes at the end of packets is easy in comparison). Another approach would be to use a combination of buffering and storing state values. In this implementation, if a packet arrives out of sequence, it could be buffered until its previous packet in sequence arrives and is scanned.

As discussed above, offset and depth tagged values may be provided to reduce the portion of a packet or packets that need to be searched. The idea is that at during every step in the scan of the AC machine, we should be able to check offset and depth values against the character position to be scanned, and decide whether or not we are proceeding on the correct path. If the values associated with the current state don't match up to the current text position, a fail transition will be made. An AC-machine state represents a prefix of one or more of the patterns we are searching for. Therefore, to ensure that we don't miss any pattern, we need to set the most conservative offset and depth value for that state. The formula we use for this is the same that is used to compute shift values, as described in Crochemore et al. as well as in the pre-processing algorithms described above. Whenever a pattern is processed, the offset and depth for a state are calculated based on distance from start state and distance until the end of the pattern, respectively. When the state is reached again during the processing of a subsequent pattern, the offset is calculated as the minimum of the current computed value and the previously set value; the depth is calculated as the maximum of the current computed value and the previously set value (an unspecified depth will be infinity, a value higher than all specified values). Offset and depth need not be changed during fail state computation; if we come across a state with an invalid offset or depth during packet scan, a jump is automatically made to the fail state.

The foregoing scheme works for cases in which a single packet is searched. As discussed above, provisions are made in one embodiment to handle cases in which an offset and/or depth applies across packets. In order to implement this scheme, it is necessary to modify the application pattern data structure once it is copied into local memory to adjust the offset and/or depth values. At the same time, corresponding data needs to be stored in the associated flow table entry (e.g., in the statistics information) to reflect: 1) that the pattern data structure needs to be adjusted; and 2) what those adjustments need to be.

In most instances, it will be unnecessary to perform offset and depth searches across multiple packets. In cases in which the applicable pattern set includes a large number of search strings, it will also usually be impractical to maintain offset and/or depth state information for each pattern in the statistics information. At the same time, offset and depth searches are typically employed to look for a particular signature (or only a few signatures). As a result, statistics information corresponding to the(se) signature(s) could be maintained in the flow table entry without consuming an excessive amount of memory. Whether or not offset and depth searches across packets is to be supported is left to the particular implementation.

Wu-Manber Algorithm Implementations

In some embodiments, search schemes based on the Wu-Manber algorithms ([WM92] S. Wu, U. Manber, "Fast Text Searching Allowing Errors", Communications of the ACM 35(10): 83-91 (1992); and [WM94] S. Wu and U. Manber. "A fast algorithm for multi-pattern searching". Technical Report TR-94-17, University of Arizona, 1994) are employed. Wu and Manber take a very different approach from the state-machine based algorithms described above. These algorithms also differ from other approaches by matching blocks of characters at a time, rather than single characters. If the total length of all patterns is M, the recommended size of the block (B) is $\log_{|\Sigma|} 2M$. The algorithm pre-computes three lookup tables called SHIFT, HASH and PREFIX. The SHIFT table is indexed by an integer that is a hashed mapping of a block of characters; this table is equivalent to the bad character table in the well-known Boyer-Moore algorithm (Boyer and J. Moore. "A fast string searching algorithm". *Communications of the ACM*, 20:762-772, 1977.). Entries for substrings common to multiple patterns contain the minimum possible shift value, to be more conservative. For larger values of B, tables could be compressed by mapping several strings to the same location, setting the minimum of the shift values in each case. The integer used to index to SHIFT is also used to index to HASH, which stores pointers to strings that map to that integer. The PREFIX table contains hash values for prefixes of each pattern, the prefix size being implementation-dependent. In each algorithm step, a set of B characters (at the right end of the text substring being scanned) are hashed to an integer, which is used to lookup the SHIFT value. If this value is greater than 0, the text is shifted. Otherwise, the hash of the prefix of this substring (of size $m_s$, where $m_s$ is the length of the shortest pattern) is computed, and matched to the prefix of each string in the corresponding HASH entry (using the PREFIX table). If a prefix matches, actual text match takes place. This algorithm depends on the pattern sizes being mostly uniform, since only the shortest pattern length is considered during matching.

The pattern data structure as well as its corresponding memory data structure are identical to that used for the DAWG-Match algorithms. Standardizing the pattern data structure makes it easy to extend the content inspection framework and implement to different search algorithms. The shift table is structured as a 2-dimensional array of integers S[n][4]. As shown in the exemplary shift table memory data structure of FIG. 16 and below, each table entry S [k] comprises a pointer to an integer array, which has the following structure:

```
{
    S[k][0]: int;      /* Primary shift value */
    S[k][1]: int;      /* Secondary shift value */
    S[k][2]: int;      /* Offset */
    S[k][3]: int;      /* Depth */
}
```

'k' is the value (usually a long integer) used to index to the shift table. If the size of the alphabet is A and the size of the substring (chunk of string) that we will use as hash value is B, the maximum size of the table is $A^B$. 'k' is a (unique) hash value obtained from a block of B characters (the simplest hash function is to consider the block to be a base-A number of B digits). The primary shift refers to the distance by which the scan position must be shifted to the right. This value is 0 only if the scanned substring matches a substring at a suitable position in one of the patterns. The secondary shift refers to the distance by which the scan position must be shifted to the right only when the primary value is zero. This shift value replaces the default shift of 1, after processing a text position for primary_shift=0. This value will always be higher than 0 (and therefore, higher than primary_shift when it is equal to 0).

The offset is the least distance from the beginning of the packet content where a valid pattern ending with the current substring under consideration (given that all patterns are truncated to the least pattern size) may occur. The depth is the maximum distance from the beginning of the packet content within which a valid pattern ending with the current substring under consideration (given that all patterns are truncated to the least pattern size) must end. The offset, depth and secondary_shift values make sense, and are used, only if the primary shift value is 0, i.e., when a substring in the text (packet content) matches the end of one of the patterns under consideration.

The HASH table is structured as a single dimensional array of pointers H[n]. As shown in the exemplary HASH table memory data structure of FIG. 17, each table entry H[k] comprises a pointer to a pattern data structure. The index into the table is identical to that for the Shift table. The patterns (truncated to the minimum pattern size) are sorted by the hash values of the chunk of B characters they end with. The value of H[k] is the first pattern in this sorted list that has a hash value greater than or equal to 'k'.

Since the patterns data structures have a fixed size, they can be accessed in a random manner from memory. Therefore, the address of a pattern data structure can be calculated using the sequence number of the pattern in the array. Accordingly, the values stored in the HASH table in memory comprise pattern index numbers (ranging from 0 to number_of_patterns −1), rather than actual addresses, in order to make the patterns relocatable.

The PREFIX table is structured as a single dimensional array of integers (usually long integers). The size of the table is equal to the number of patterns in the pattern set, and the pattern (or pattern index number) is used as index to any entry of the Prefix table. The value Prefix[k] is a hash of the first B' characters in pattern number 'k' ('k' ranging from 0 to number_of_patterns −1). The hash is typically computed in an identical way to that computed for the Shift table (by considering the prefix to be a base-A number consisting of B' digits). In the memory representation (one embodiment of which is shown in FIG. 18), each table entry is the unmodified prefix value, since the alphabet to be employed comprises the entire ASCII set.

Both the SHIFT and HASH tables contain a large amount of redundant information. The size of these tables is exponential, while the set of patterns is likely to be few in number. Therefore, we could expect most of the SHIFT table values to be equal to the default value. Similarly, a large number of HASH table entries would contain useless information that would never be looked up. On the other hand, this significant waste of memory is compensated by the performance benefits of looking up information in constant time. For larger values of B (3 or more), the memory usage becomes prohibitive, so we use a B+ tree as a compressed data structure with a relatively small number of lookups required to fetch any piece of information.

This B+ tree is structured as a tree of nodes, where each leaf has constant distance from the root. Though the number of levels could be arbitrary, we have chosen the depth to be two, which will suffice for most practical purposes. Each child node is an array of the following structure:

The root node is special and is a constant-size array, each element being structured as follows:

```
struct bplus_tree_node {
    struct hash_record *list;    /* Pointer to child node */
    int num_elements;            /* Number of elements in list */
};
struct bplus_tree_node root[A];
```

An exemplary memory structure of a root node is shown in FIG. 19. The root has 'A' elements of type struct bplus_tree_node, where A is the alphabet size (256 in the case of the ASCII set).

Consider the SHIFT table. If the index value is a hash of a chunk of B characters $c_1 c_2 \ldots c_B$, each element of the root can be accessed randomly by computing the hash value of the most significant byte of that chunk $c_1$. The remainder of that chunk ($c_2 \ldots c_B$) is mapped to the key_value of an elements of a child node. Each child node (list) need not contain entries for all possible hash values for strings of size B−1; it only contains entries for those elements that don't have associated default primary shift value (which will be equal to Minimum_pattern_size-B+1). To access the information located in SHIFT_table[$c_1 c_2 \ldots c_B$], we look up root[$c_1$].list(k) (where list(k) refers to the element in root[$c_1$].list having key value=hash value of $c_2 \ldots c_B$). HASH table values are looked up in the same way.

The meaning of each entry in the foregoing structure is generally self-evident. The patlist_end and pend parameters do not refer to the last pattern in the list of patterns that are obtained from a particular HASH table entry; but rather refer to the pattern pointed to by the next HASH entry, or the pattern following this list of patterns in the global sorted pattern list.

FIG. 20 shows one embodiment of a child node memory data structure. Although the root nodes and each of the child nodes are designed to be independently relocatable in memory, the embodiment of FIG. 20 is implemented such that the child nodes immediately follow the root structure. Also, child nodes are written into memory in contiguous fashion, ordered by the index value of the parent element. Storing this data contiguously makes memory pre-allocation easy, and only one pointer (the address of the first word of the root) need be specified explicitly.

The Wu-Manber algorithm assumes that all patterns are of equal length; its correct operation relies on this assumption. Since that is not a practical assumption, we need to truncate all strings to the size of the shortest pattern. During an algo-

```
struct hash_record {
    long key_value;              /* Hash value (index to SHIFT and HASH tables) */
    int primary_shift;           /* Primary shift (as in the SHIFT table) */
    int secondary_shift;         /* Secondary shift (as in the SHIFT table) */
    int offset;                  /* Offset (as in the SHIFT table) */
    int depth;                   /* Depth (as in the SHIFT table) */
    struct Pattern *patlist_start;  /* Pointer to start of pattern list (HASH table entry)*/
    struct Pattern *patlist_end;    /* Pointer to end of pattern list (next HASH table entry) */
    int pstart;                  /* Pattern number in sorted list of patlist_start */
    int pend;                    /* Pattern number in sorted list of patlist_end */
};
``` rithm run, the complete pattern is matched when a candidate position is discovered. The patterns that are passed to all pre-processing functions are truncated.

Pseudo-code examples used build the SHIFT, HASH, PREFIX, and B+ trees are provided in the appendix at the end of this specification. Additionally, pseudo-code for implementing variations of the Wu-Manber algorithms is likewise provided in the appendix.

The Wu-Manber algorithm in the appendix significantly varies from that described in [WM94]. This algorithm supports extra features of patterns, such as offset, depth and case independence. There is also one more difference in the basic algorithm, which is the secondary shift value. In the original algorithm proposed by Wu and Manber [WM94], if the primary shift value turned out to be 0, the skip value was always forced to be 1. This certainly ensures correct operation, but a skip of 1 is too conservative. The secondary shift indicates the least distance that needs to be skipped in order to match the substring (chunk of size B) under consideration. The largest safe value for this skip will be the second lowest shift calculated during the computation of the SHIFT table, which is exactly our definition of the secondary shift.

As is evident from the Wu-Manber algorithm description, the largest prefix of any pattern that is matched at the end (suffix) of a previous packet is provided as input to the algorithm when it is executed for the next packet. This information is provided in two parts: prefix_address, the address of the first byte of the pattern string whose prefix was matched, and prefix_length, the size of the prefix (or the number of bytes of the pattern that were matched successfully). For the first packet in the flow, the prefix of a pattern matched in the previous pattern is the empty string, so the prefix_length parameter value will be 0, and the prefix_address uninitialized.

Towards the end of the packet scan, during a loop iteration, the chunk to be used as index to the table entries will cross the end of the packet (i.e., position>=size of packet). When this happens, we have to revert partially to the naïve string-matching algorithm. While there are still some inspected characters left at the end of the packet, those are matched to the prefix (of the same size) of every pattern in our pattern set. As soon as a match is obtained, the length and the address of the match are recorded in prefix_length and prefix_address respectively. When the next packet in sequence is to be scanned, this prefix matched is appended to the packet content and the scan proceeds in normal fashion.

This technique for matching patterns that span multiple packets fails when packets arrive out of sequence. Matching arbitrary suffixes at the beginning of a packet, hoping that it is part of a pattern that began in a previous packet will not work. As mentioned for the DAWG-Match case, a combination of buffering and state maintenance could provide a comprehensive solution.

In some embodiments, the foregoing Wu-Manber algorithms may also be employed for offset/depth searching. While attempting to match patterns, we also need to ensure that the offset and depth constraints are met, and we don't waste cycles in trying to match a pattern that might be present but turn out to have invalid limit values. Therefore, we associate valid offset and depth values with each SHIFT table entry. The offset and depth values are set in the same way as the shift values are, by selecting the safest possible value. If a chunk of bytes S is used to index into the SHIFT table, the corresponding offset is set to be the minimum offset of any pattern that ends with this chunk (the pattern is truncated first to the shortest pattern length). Similarly the depth is set to be the maximum value of (depth−length+minimum_pattern_size), as this indicates where the truncated pattern must end within the text.

During a packet scan, when a primary shift value of 0 is observed, we first check the offset and depth (looked up from the table) and match them to the current text position. Only if the constraints are met do we proceed to cycle through the list of patterns indicated by the HASH table. During this procedure, after a successful PREFIX table match and before the entire pattern match is attempted byte-by-byte, the offset and depth associated with the patterns themselves are matched with the current text position. If the current position is within limits, the complete pattern match is attempted. If any of the offset and depth checks described above fail, the position is incremented by a value equal to the secondary shift and the search continued.

Case independence, fortunately, can be handled with much greater memory efficiency by the Wu-Manber algorithm as compared to the DAWG-Match algorithm. The extra work that needs to be done is mostly shifted to the pre-processing phase. While updating a SHIFT table, if a case independent pattern is processed, all case-dependent combinations of the B-length chunk under consideration are computed and the SHIFT table entries corresponding to each of those combinations adjusted. For the HASH and the PREFIX tables, index and prefix values are computed from lower case equivalents of case-independent patterns.

During a packet scan, a SHIFT table lookup is straightforward and no addition is required to the original algorithm proposed by Wu and Manber, as valid SHIFT entries exist for all potential case combinations. For the HASH table lookup though, we need to compute two separate index values:

Normal index, using the characters of the chunk as they are; and

Lower case index, computed by converting all upper case characters in the B-chunk to lower case.

The second index is necessary as the HASH entry for a case independent pattern is computed from lower case characters only. The entire cycle of checking prefixes, followed by matching complete patterns is done twice, one for the normal index value and another for the lower case index value. Likewise, both normal and lower case versions of the pattern prefixes are computed. If the pattern under consideration is case independent, the lower case prefix is matched, otherwise the normal one is matched. Once the algorithm gets down to matching patterns byte-by-byte with the packet content, case-independent matching becomes straightforward.

In one embodiment, the content inspection framework is designed to be a module that could be plugged into a previously-implemented stateful firewall framework. Under the Intel IXP processing model, the content inspection framework can be plugged in as a single microblock into any packet-processing pipeline. In one embodiment, the firewall uses CA (Condition-Action) pairs for rule processing. For example, certain CA rules could pertain to content inspection, like checking for a particular offending pattern with packet content (condition) and dropping the packet if the pattern is detected (action).

The memory map for a typical content inspection CA rule is shown in FIG. 21. The first two words (or the first long word) are reserved, and the actual information begins at an offset of 8 bytes. The meanings of each of the fields is as follows:

1. Algorithm code: This indicates the type of search algorithm to use.
    1=DAWG-Match algorithm
    2=Suffix Tree-Match algorithm
    3=Wu-Manber algorithm
    4=Wu-Manber algorithm using B+ tree structure in place of SHIFT and HASH tables
    5=Match pattern given exact start position (i.e. it is assumed that the pattern starts at the specified position or doesn't occur at all)
2. SRAM address: This indicates the address (or pointer to index of addresses) of data structures used for pattern searching. For the first 4 algorithms, this address points to the first word of the master index; this contains information about the addresses of the various data structures that are used for inspection.
3. 'Spanning pattern check' policy: For the first 4 algorithm codes, this is just a flag that has a value 0 (which indicates that checks for patterns that could span multiple packets should not be made) or 1 (which indicates that such checks must be made). For the exact position match, this field indicates the position in the packet content (as an offset from the first byte) where the pattern match should be performed.

In order to check for patterns spanning multiple packets, we need to store the partial match information (AC state for DAWG match, pattern address and prefix length for Wu-Manber) with the entry corresponding to the current flow in the flow table. We also need to store some information regarding the validity of the stored information when the next packet arrives to be processed. For TCP flows, therefore, we store the sequence number of the next expected offset along with the state information. Similar kinds of sequence information could be stored for any other connection-oriented protocol.

In one embodiment of the flow table entry, this information is stored in the following manner: the first word is the expected sequence number of the first byte in the next packet, the second word is the AC machine state from the end of the previous scan (for algorithm codes 1 and 2) or the prefix length (algorithm codes 3 and 4) and the third word is the partially matched pattern address (used only for algorithm codes 3 and 4). Initialization and Code Load Returning to FIG. 7, during initialization of a network line card or network device, coded instructions (e.g., microcode) to facilitate various packet-processing and content inspection functions and operations described herein are loaded into the control stores 728 of the selected ME's. In general, the instructions may be loaded from an instruction store 715 comprising a non-volatile storage device, such as a flash memory device. Other examples of non-volatile stores include read-only memories (ROMs), programmable ROMs (PROMs), and electronically erasable PROMs (EEPROMs).

In addition to loading the instructions from a local (to line card 700) storage device, instructions may be loaded from an external source. For example, in one embodiment, the instructions are stored on a disk drive hosted by another line card (not shown) or otherwise provided by the network element in which line card 700 is installed. In yet another embodiment, the instructions are downloaded from a remote server or the like via a network as a carrier wave.

In general, each of the functional blocks illustrated in the figures and discussed herein may be implemented using programmable logic in hardware, programmable logic in firmware/software via execution of corresponding threads on one or more compute engines, or a combination of the two. For example, in one embodiment the operations depicted for each of deep packet inspection module 202, flow manager 204, queue manager 708, and receive engine 710 are facilitated by executing corresponding instruction threads on one or more compute engines in an NPU in a manner integrated into a context pipeline used for packet processing. Optionally, all or a portion of the various operations provided by the foregoing functional blocks may be implemented by appropriately-programmed logic embedded on an NPU or the like.

Thus, embodiments of this invention may be used as or to support firmware/software modules and/or programs executed upon some form of processing core or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

APPENDIX

1. The algorithm for the construction of the SHIFT table is given below in pseudo-C code.

*Input*: Array of patterns, Chunk size used for hashing into table (B), Alphabet size (A)
*Output*: Pointer to SHIFT table

```
int **build_SHIFT_table(struct Pattern *P, int num_pat, int B, int A)
{
        /* Initialization */
        table_size = A^B;
        min_pattern_size = minimum(P_i.length);
        default_offset = minimum(P_i.offset);
        default_depth = minimum(P_i.depth);

for(each entry of the SHIFT_table, i: 0 to table_size-1)
        {
                /* Initialize each entry to the default value before pattern processing */
                SHIFT_table[0][0] = min_pattern_size-B+1;
                SHIFT_table[0][1] = min_pattern_size-B+1;
                SHIFT_table[0][2] = default_offset;
                SHIFT_table[0][3] = default_depth;
        }

/* Process patterns and update SHIFT_table values */
        for(each pattern P_i, i:0 to num_pat-1)
        {
                for(each substring S = P_i.string[j...j+B-1], j: 0 to min pattern size-B)
                {
                /* Compute hash value to index into SHIFT_table */
                Sval = HASH_value(S);
                /* Compute primary shift as least offset from start position of substring
                   to end of pattern */
                SHIFT_table[Sval][0] = minimum(SHIFT_table[Sval][0],min_pattern_size-j-B);
                /* Compute secondary shift as second least shift value for the particular
                   substring */
                SHIFT_table[Sval][1] = least value of (min_size-j-B) that is strictly
                greater than SHIFT_table[Sval][0];
                /* Compute offset as least offset among all patterns containing this
                   substring */
                SHIFT_table[Sval][2] = minimum(SHIFT_table[Sval][2], P_i.offset);
                /* Compute depth as maximum depth among all patterns containing this
                   substring */
                SHIFT table[Sval][3] = maximum(SHIFT table[Sval][3], P_i.depth - P_i.length +
                min_pattern_size);

/* Update SHIFT_table for case independent patterns */
                if(P_i.fcase == 0)
                {
                        for(each possible case combination of S)
                        {
                                val = HASH value(instance of S);
                                /* Update all four fields: both shifts, offset and depth in
                                   the same way as above */
                                update(SHIFT_table[val]);
                                :
                        }
                }
        } return SHIFT_table;
}
```

2. The algorithm for the construction of the HASH table is given below in pseudo-C code.

*Input*: Array of patterns, Chunk size used for hashing into table (B), Alphabet size (A)
*Output*: Pointer to HASH table

```
struct Pattern **build_HASH_table(struct Pattern *P, int num_pat, int B, int A)
{
        /* Initialization */
        table_size = A^B;
        min_pattern_size = minimum(P_i.length);
        sort(P, in ascending order based on hash value computed from each
        P_i.string[min_pattern_size-B...min_pattern_size-1]);

/* Initialize index value into HASH_table */
        index = 0;
        for(each pattern P_i, i:0 to num_pat-1)
        {
                /* Obtain substring of B characters that each pattern ends with */
                S = P_i.string[min_pattern_size-B...min_pattern_size-1];
                /* If pattern is case independent, map it to its lower case equivalent */
                if(P_i.fcase == 0)
                        S = convert_to_lower_case(S);

Sval = HASH_value(S);
                while(Sval < count)
                {
                        /* Keep updating table values and pointers until hash value gets
                           large enough */
                        HASH_table[index] = P_i;
                        HASH_table_pattern_number[index] = i;
                        index ++;
                }
        }
        /* For higher index values, fill up with non-existent pointer entry; this does not
           matter as such index values will never be looked up */
        for(each i:index to table_size-1)
        {
                HASH_table[index] = P_{num_pat};
                HASH_table_pattern_number[index] = num_pat;
        } return HASH_table;
}
```

3. The algorithm for the construction of the PREFIX table is given below in pseudo-C code.

*Input*: Array of patterns, Size of prefix (B'), Alphabet size (A)
*Output*: Pointer to PREFIX table

```
long int *build_PREFIX_table(struct Pattern *P, int num_pat, int B', int A)
{
        /* Initialization */
        table_size = num_pat;

for(each pattern P_i, i:0 to num_pat-1)
        {
                /* Compute hash of prefix value; if pattern is case independent, convert
                   prefix into lower case and compute hash */
                S = P_i.string[0....B'-1];
                if(P_i.fcase == 0)
                        S = convert_to_lower_case(S);

PREFIX_table[i] = HASH_value(S);
        } return PREFIX_table;
}
```

4. The algorithm for the construction of the B+ tree is given below in pseudo-C code.

*Input*: Array of patterns sorted by hash value (hash computed in the same way as for the SHIFT and HASH tables), Size of prefix (B'), Alphabet size (A), SHIFT table, HASH table
*Output*: Pointer to B+ tree root

```
struct   bplus_tree_node   *build_Bplus_tree(int    **SHIFT_table,   struct   Pattern
**HASH_table, int *HASH_table_pattern_number, struct Pattern *P, int num_pat, int
B', int A)
{
        /* Compute default primary shift; these are the entries we will eliminate */
        min_pattern_size = minimum(P_.length);
        default primary shift = min pattern size-B+1;

start = 0;      /* Initialize SHIFT table entry position to scan from */

/* Generate a child node per iteration */
        for(i:0 to A-1)
        {
                /* Process A^{B-1} SHIFT and HASH table entries during each loop iteration and
                   generate hash records for each entry with a non-default primary shift */
                counter = 0;
                for(j:start to start + A^{B-1})
                {
                        if(SHIFT_table[j][0] != default_primary_shift)
                        {
                                /* Add all SHIFT and HASH table information and set key */
                                root[i].list[counter].primary_shift = SHIFT_table[j][0];
                                root[i].list[counter].secondary_shift = SHIFT_table[j][1];
                                root[i].list[counter].offset = SHIFT_table[j][2];
                                root[i].list[counter].depth = SHIFT_table[j][3];
                                root[i].list[counter].patlist_start = HASH_table[j];
                                root[i].list[counter].patlist_end = HASH_table[j+1];
                                root[i].list[counter].pstart =
                                                          HASH_table_pattern_number[j];
                                root[i].list[counter].pend =
                                                          HASH_table_pattern_number[j+1];
                                root[i].list[counter].key_value = j-start;
                                counter++;
                        }
                        root[i].num_elements = count;
                        start = start + A^{B-1};
                :
        } return root;
}
```

The field *key_value* is actually the index of the *hash_record* structure list, if all records (inclusive of the ones with default shift values) were added). Therefore, the above algorithm ensures that *list* (for each tree child node) is sorted in ascending order of *key_value*.

Wu-Manber algorithm

*Input*: Packet content (string of bytes) T[0...n-1], SHIFT table, HASH table, PREFIX table, Length of shortest pattern, Number of patterns, Chunk size (B), Prefix size (B'), Flag (policy) indicating whether or not we need to check for patterns spanning packet boundaries. Length of a pattern prefix matched at the end of the previous packet, Address of pattern string whose prefix was matched at the end of the previous packet.
*Output*: Identity of pattern detected (or -1 if none detected), Position of start of pattern as offset from the start of the string T.

The algorithm is described below in pseudo C-code.

```
Wu_Manber(int **SHIFT_table, struct Pattern **HASH_table, long int *PREFIX_table,
char   *T,   int   span_policy,   int   *prefix_length,   char   *prefix_address,   int
MIN_PATTERN_SIZE, int NUM_PATTERNS, int B, int B')
{
        /* Initialize position to earliest possible end position of a truncated pattern */
        position = MIN_PATTERN_SIZE-1;

/* If pattern overlap check needs to be made, append prefix matched in previous
           packet at the beginning of the packet content */
        if(span_policy == CHECK_SPANNING_PATTERN)
        {
                S = Prefix(pattern at address prefix_address, length = prefix_len)
                T = append(S to the beginning of T);
        } while(position < PACKET_SIZE)
        {
                /* Get chunk ending at 'position' and compute table index value */
                chunk = T[position-B.....position];
                chunk_val = HASH_value(chunk);

/* Convert to lower case and compute index; this will be used later */
                chunk_lower_case = convert_to_lower_case(chunk);
                chunk_val_lower_case = HASH_value(chunk_lower_case);

if(SHIFT_table[chunk_val][0] > 0)
                {
                        /* No pattern can be found at this position, so shift and try to
                           match at the next position */
                        position = position + SHIFT_table[chunk_val][0];
                        continue;
                }

/* Primary shift value is 0, so we have a potential match starting at
                   'position MIN_PATTERN_SIZE+1' */

/* Check offset for candidate position */
                if(position-MIN_PATTERN_SIZE+1 < SHIFT_table[0][2])
                {
                        /* No pattern ending with chunk satisfies offset limit at current
                           position, so skip using secondary shift value and try to match
                           at the next position */
                        position = position + SHIFT_table[chunk_val][1];
                        continue;
                }

/* Check depth for candidate position */
                if(position >= SHIFT_table[0][3])
                {
                        /* No pattern ending with chunk satisfies depth limit at current
                           position, so skip using secondary shift value and try to match
                           at the next position */
                        position = position + SHIFT_table[chunk_val][1];
                        continue;
                }

/* Compute prefix values (normal and lower case) for candidate string */
                prefix = T[position-MIN_PATTERN_SIZE-1....position-MIN_PATTERN_SIZE+B'];
                prefix_val = HASH_value(prefix);
                prefix_lower_case_val = HASH_value(convert_to_lower_case(prefix));

/* Candidate patterns: pointer to patterns are in ascending order */
                for(each pattern P_i: HASH_table[chunk_val] <= P_i < HASH_table[chunk_val+1])
                {
                        if(P_i.fcase == 0 && prefix_lower_case_val == PREFIX_TABLE[i])
                        {
                                /* Convert both strings to be matched to lower case*/
                                String1 = convert_to_lower_case(P_i.string);
                                String2 = convert to lower case(T[position-
                                                MIN_PATTERN_SIZE+1........position-
                                                MIN_PATTERN_SIZE+P_i.length);
```

```
                    if(String1 == String2)
                    {
                            Record P_i;       /* Pattern match */
                            Record 'position';
                            Depending on policy, return or continue scanning T;
                    }
                }
                else if(P_i.fcase == 1 && prefix_ val == PREFIX_TABLE[i])
                {
                    if(P_i.string == T[position-MIN_PATTERN_SIZE+1.....position-
                       MIN_PATTERN_SIZE+P_i.length)
                    {
                            Record P_i;       /* Pattern match */
                            Record 'position';
                            Depending on policy, return or continue scanning T;
                    }
                }
            }

/* Now replace chunk matched to index into SHIFT_table with its lower case
               equivalent */
            Repeat(above 'for' loop replacing 'chunk_val' by 'chunk_val_lower_case');

/* Skip using secondary shift value and continue scanning */
            position = position+SHIFT_table[chunk_val][1];
    }

/* If we don't need to check if a pattern might span multiple packets, return */
    if(span_policy == CHECK_SPANNING_PATTERN)
            return;

/* Calculate start position of a candidate pattern that could overflow into the
       next packet */
    position = position-MIN_PATTERN_SIZE+1;

while(position < PACKET_SIZE)
    {
            for(each pattern P_i, i:0 to num_pat)
            {
                    /* Length of packet content remaining that could match a prefix of
                       one of the patterns */
                    length = PACKET_SIZE-position+1;

/* Match prefix from the PREFIX table before attempting complete
                   match */
                if(P_i.fcase == 0)
                {
                    if(length >= B')
                            if(PREFIX_table[i] != T[position....position+B'-1])
                                    continue;
                    if(T[position....PACKET_SIZE-1] == P_i.string[0....length-1])
                    {
                            Record prefix_length = length;
                            Record prefix_address = P_i.string;
                            return;
                    }
                }
                If pattern P_i is case independent, attempt above match in a case-
                independent way;
            }
    }

Record prefix_length = 0;
return;
```

Wu-Manber algorithm using B+ trees

*Input:* Packet content (string of bytes) T[0...n-1], B+ tree root pointer, PREFIX table, Length of shortest pattern, Number of patterns, Chunk size (B), Prefix size (B'), Flag (policy) indicating whether or not we need to check for patterns spanning packet boundaries. Length of a pattern prefix matched at the end of the previous packet, Address of pattern string whose prefix was matched at the end of the previous packet

*Output:* Identity of pattern detected (or -1 if none detected), Position of start of pattern as offset from the start of the string T.

The algorithm is identical to the earlier described Wu-Manber algorithm, except for the data structures used for shift values and pointer lookup. The primary and secondary shifts, as well as the offset and depth values are now looked up from a B+ tree child entry (from a *hash_record* structure) instead of a SHIFT table. Pointers to the candidate patterns that might occur at a given position are also obtained from the same B+ tree child node entry instead of a HASH table. But unlike a SHIFT or a HASH table, these values cannot be looked up directly (in constant time). A sequential scan would be too inefficient. Therefore, we use binary search to locate the appropriate record; the lookup steps are described below:

1. Get the chunk (substring) $c_1 c_2 .. c_B$ used to compute the hash value.
2. Use most significant byte ($c_1$) to locate the appropriate child node pointer and number of child nodes (`root[c₁].list` and `root[c₁].num_elements`).
3. Use the rest of the chunk $c_2..c_B$, mapped to an integer, to locate the appropriate *hash_record* structure. This integer will be the *key_value* of any matching structure. Since all structures are sorted in ascending order based on *key_value*, a simple binary search will return the required data). For an alphabet of size 256, a maximum of 8 lookups will be required to locate a record.

All algorithm steps apart from the data lookup are identical to those in the Wu-Manber algorithm described above.

Practical values for B would be 2 and 3 (having B = 1 would defeat the purpose of building a tree, though it would work). Practical values for B' would be 4 or less. Both B and B' must be smaller than the length of the shortest pattern.

What is claimed is:

1. A method implemented in a network processor, the method comprising:
    receiving a plurality of packets at said network processor;
    classifying the packets to assign the packets into one or more flows;
    performing content inspection on at least some of the packets using a multi-pattern search and employing values for at least one search pattern, the values comprising an offset value identifying an offset in a flow at which a search pattern may start and a depth value identifying a depth in the flow to which the flow is to be searched for the search pattern, wherein at least one of the offsets and depths for at least two search patterns in the multi-pattern search are different; and
    forwarding at least a portion of the packets based at least in part on the classifying and the content inspection.

2. The method of claim 1, wherein performing content inspection comprises:
    detecting a partial match between one of the search patterns and a first portion of a search string located towards an end of a given packet in the flow;
    saving string search state information corresponding to the partial match;
    retrieving the string search state information in response to receiving another given packet in the flow; and
    employing the string search state information to detect a full match on a second portion of the search string beginning toward a start of the other given packet.

3. The method of claim 1, wherein the content inspection is performed using a computer implementation of a single multi-pattern string-search algorithm.

4. The method of claim 3, wherein the content inspection is performed via a computer implementation of a string search algorithm based on the DAWG (Directed Acyclic Word Graph) match algorithm.

5. The method of claim 3, wherein the content inspection is performed via a computer implementation of a string search algorithm based on the Wu-Manber algorithm.

6. The method of claim 1, further comprising:
    implementing content inspection using the at least one offset and at least one depth value to search a flow spanning multiple packets.

7. The method of claim 6, further comprising:
    identifying a search pattern match having a first portion comprising a prefix match located toward the end of an earlier packet and a second portion comprising a suffix match located toward the beginning of a following packet in the flow.

8. The method of claim 1, further comprising:
    identifying a string match condition has occurred via content inspection of the packet; and
    performing an associated action for the condition to process subsequently-received packets assigned to the same flow.

9. The method of claim 1, further comprising:
    performing a multi-pattern search including offsets and depth values including at least one case-independent search pattern.

10. A network processor comprising:
    flow manager circuitry to assign a plurality of received packets into one or more flows;
    packet inspection circuitry to perform content inspection on at least some of the packets using a multi-pattern search and employing values for at least one search pattern, the values comprising an offset value identifying an offset in a flow at which a search pattern may start and a depth value identifying a depth in the flow to which the flow is to be searched for the search pattern, wherein at least one of the offsets and depths for at least two search patterns in the multi-pattern search are different and to forward at least a portion of the packets based at least in part on the flow assignment and the content inspection.

11. The network processor of claim 10, wherein the packet inspection circuitry to detect a partial match between one of the search patterns and a first portion of a search string located towards an end of a given packet in the flow, to save string search state information corresponding to the partial match, to retrieve the string search state information in response to receiving another given packet in the flow; and to employ the string search state information to detect a full match on a second portion of the search string beginning toward a start of the other given packet.

12. The network processor of claim 10, wherein the content inspection is performed using a computer implementation of a single multi-pattern string-search algorithm.

13. The network processor of claim 12, wherein the content inspection is performed via a computer implementation of a string search algorithm based on the DAWG-(Directed Acyclic Word Graph) match algorithm.

14. The network processor of claim 12, wherein the content inspection is performed via a computer implementation of a string search algorithm based on the WuManber algorithm.

15. The network processor of claim 10, wherein the packet inspection circuitry to perform content inspection using the at least one offset and at least one depth value to search a flow spanning multiple packets.

16. The network processor of claim 15, wherein the packet inspection circuitry to
    identify a search pattern match having a first portion comprising a prefix match located toward the end of an earlier packet and a second portion comprising a suffix match located toward the beginning of a following packet in the flow.

17. The network processor of claim 10, wherein the packet inspection circuitry to
    identify a string match condition has occurred via content inspection of the packet and to perform an associated action for the condition to process subsequently-received packets assigned to the same flow.

18. The network processor of claim 10, wherein the packet inspection circuitry to
    perform a multi-pattern search including offsets and depth values including at least one case-independent search pattern.

* * * * *